United States Patent
Wang et al.

(10) Patent No.: US 12,045,664 B1
(45) Date of Patent: Jul. 23, 2024

(54) CLASSIFYING WORKLOADS FOR BURSTABLE COMPUTE PLATFORMS

(71) Applicant: Amazon Technologies, Inc., Seattle, WA (US)

(72) Inventors: Siyu Wang, Seattle, WA (US); Chia-Yu Kao, Sammamish, WA (US); Leslie Johann Lamprecht, Seattle, WA (US); Qijia Chen, Seattle, WA (US); Letian Feng, Clyde Hill, WA (US)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 17/206,562

(22) Filed: Mar. 19, 2021

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/4557* (2013.01); *G06F 2009/45595* (2013.01)

(58) Field of Classification Search
CPC ............... G06F 9/5077; G06F 9/45558; G06F 2009/4557; G06F 2009/45595
See application file for complete search history.

(56) References Cited

U.S. PATENT DOCUMENTS 10,097,627 B1    10/2018  Gafton et al.
11,372,689 B1*    6/2022  Allen .................... G06F 9/4887
2008/0028409 A1*  1/2008  Cherkasova .......... G06F 9/5061
                                                        718/104
2008/0271038 A1* 10/2008  Rolia ...................... G06F 9/505
                                                        718/105
2013/0346360 A1* 12/2013  Liu ..................... G06Q 10/0639
                                                        707/609
2014/0082612 A1*  3/2014  Breitgand ........... G06F 9/45533
                                                          718/1
2018/0213036 A1*  7/2018  Vasetsky ............... H04L 41/082
2019/0220319 A1*  7/2019  Parees .................. G06F 9/5027
2020/0050694 A1*  2/2020  Avalani .............. G06F 16/2455
2020/0218566 A1*  7/2020  Maes ...................... G06F 9/505
2020/0314174 A1* 10/2020  Dailianas ............ G06F 9/45558
2020/0314175 A1* 10/2020  Dailianas ........... G06Q 30/0283

* cited by examiner

*Primary Examiner* — Dong U Kim
(74) *Attorney, Agent, or Firm* — Lee & Hayes, P.C.

(57) ABSTRACT

Techniques for a cloud-based workload optimization service to identify customer workloads that are optimized to run on burstable instance types. The techniques include identifying workloads that are successfully running on burstable instance types, and using historical-utilization data for those workloads to train classification models. The optimization service can extract feature data from the historical-utilization data, where the feature data represents utilization characteristics that are indicative of burstable workloads. The feature data is then used to train classification models to receive utilization data for candidate workloads, and determine whether the candidate workloads would be optimized for burstable instance types. The optimization service can then migrate suitable workloads to burstable instance types, and/or provide users with recommendations that their workloads are optimized or suitable for burstable instance types.

20 Claims, 14 Drawing Sheets

CLASSIFYING WORKLOADS FOR BURSTABLE COMPUTE PLATFORMS

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances," "VM instances," or simply "instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

However, some workloads may generally require relatively low amounts of computing resources for the lifetime of the workload, but may periodically or intermittently require relatively high amounts of computing resources. As an example, workloads that support a weather application may utilize relatively low and consistent amounts of compute resources for the majority of the day, but for an hour or two in the mornings, may see a large spike in usage as users check to see what the weather will be for the day. Thus, it may be advantageous to host these types of workloads using VM instance types that have relatively low computing-resource allocation for the majority of the day, but these VM instance types might throttle performance of the workloads during the high-usage hours, which decreases user satisfaction. Accordingly, service providers may provide "burstable" VM instance types that provide baseline levels of computing resources along with the ability to periodically or intermittently burst above the baseline.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
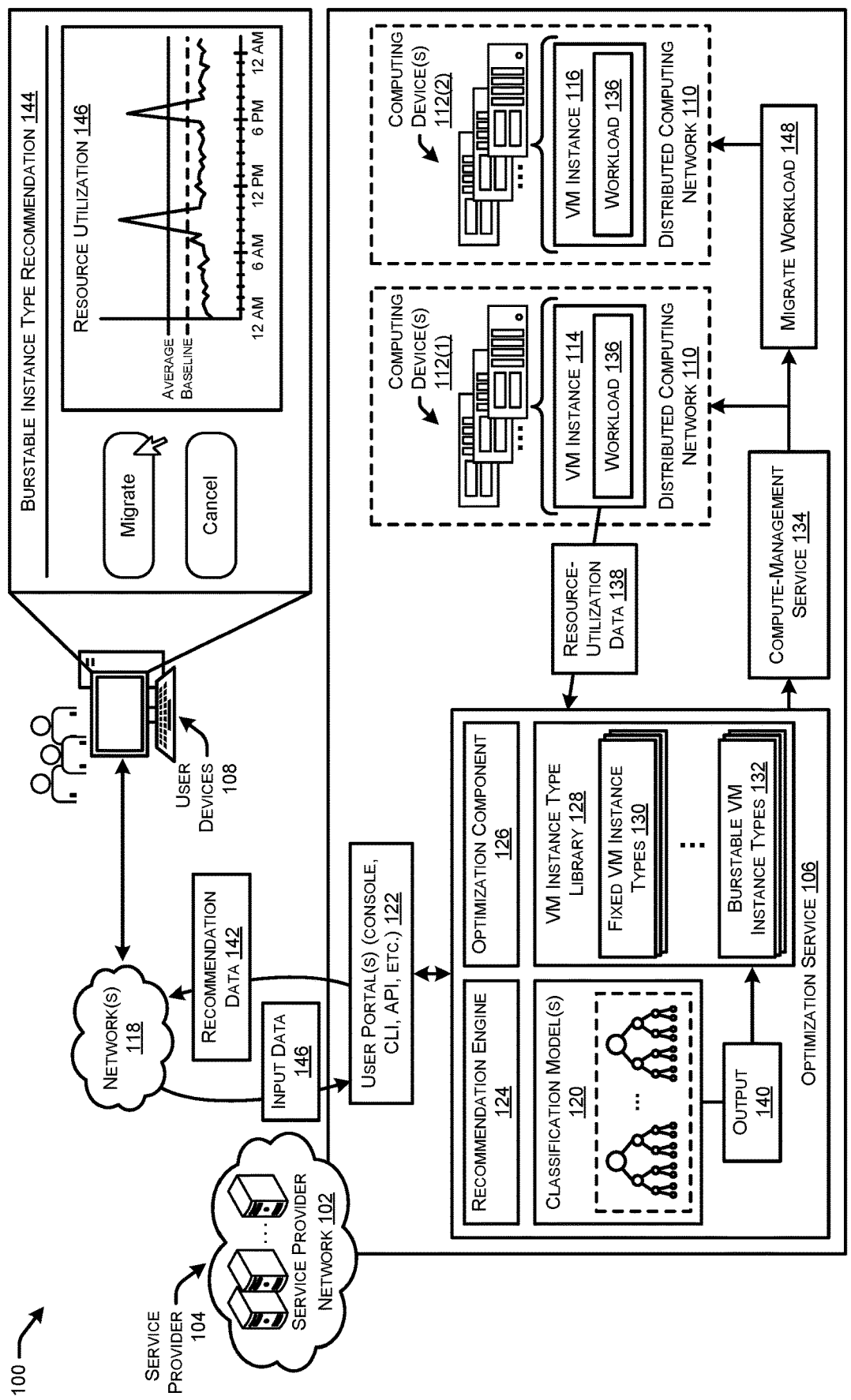
FIG. 1 illustrates a system-architecture diagram of an example environment in which an optimization service of a service provider network determines that a workload is suitable and/or optimized to be hosted on a burstable VM instance type.

As noted above, service providers may utilize virtualization technologies such that servers, or other physical computing devices, are able to concurrently host multiple virtual computing resources. Service providers may provide dedicated instances (or "fixed instances," "non-burstable instances," etc.) that are allotted a guaranteed, fixed quantity of resources. Additionally, service providers may provide "burstable" instance types that have baseline performance guarantees of computing resources along with the ability to periodically or intermittently burst above that baseline. Various types of workloads can benefit from running on burstable instances, such as workloads that do not need the full performance of computing resources on a continuous basis (e.g., web servers, proof of concepts, small databases, etc.). While these burstable instances are advantageous for many workloads, it can be difficult to determine whether a workload would benefit from being hosted on a burstable instance type.

The present disclosure relates to a cloud-based workload optimization service that can identify customer workloads that are suitable and/or optimized to run on, or would benefit from running on, burstable instance types rather than dedicated (or fixed) instance types. The techniques include identifying workloads that are successfully running on burstable instance types, and obtaining historical-utilization data for those workloads to train classification models. The optimization service can extract feature data from the historical-utilization data, where the feature data represents utilization characteristics that are indicative of workloads being suitable and/or optimized for burstable instances. The feature data is then used as training data for training classification models to receive utilization data for candidate workloads, and determine whether the candidate workloads would be suitable or optimized for burstable instance types. More specifically, the classification models determine whether utilization characteristics of candidate workloads are similar to, or different than, other workloads that have been identified as suitable or optimized for burstable instance types. The optimization service can then migrate suitable workloads to burstable instance types, and/or provide users with high-confidence recommendations that their workloads are optimized or suitable for burstable instance types.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of instance types optimized to support different workloads. Generally, each instance type may be allocated a different amount of computing resources, and/or different combination of computing resources, such that the instance types are optimized to support different workloads. As used herein, computing resources refers to compute, memory, storage, networking, and, in some implementations, graphics processing. As an example, one instance type may be allocated a larger amount of compute (e.g., processor cycles) and be optimized to support compute-heavy workloads, whereas another instance type may be allocated a larger amount of storage (e.g., disk space) and be optimized to support storage-intensive workloads. In this way, users can select an instance type or platform that is more optimized to support their workload, thereby increasing the performance of the workload while reducing underutilization of computing resources by the service provider network.

Generally, an increase in the complexity and diversity of instance types offered by the service provider network is advantageous and results in a higher likelihood that workloads are supported by a more optimized instance. While a large variety of instance types is advantageous for various reasons (e.g., efficient utilization of computing resources, high performance for workloads, etc.), it also may become difficult for users, particularly new users, to select a suitable or appropriate instance type to support their workload(s). For example, users may attempt to map out the computing resource needs of their workload and then peruse the offering of instance types to locate an instance type that seems appropriate for their needs. In other examples, users may go through a time-consuming trial-and-error process to analyze performance of their workloads using different instance types. However, not only is this time consuming, but it may also result in users having their workloads hosted on instance types that are either overutilized and resource constrained, or underutilized and resulting in computing resources that may be unused and sitting idle. As an example, users may be overly cautious and select an over-sized instance type to help ensure that their workloads are never resource constrained, which may result in low utilization of computing resources of the service provider network.

In some instances, service provider networks may provide an optimization service to help users optimize the selection, configuration, and utilization of VM instance types to support their workloads. The optimization service may provide recommendations to users that help improve performance of their workloads, and that also increase the aggregate utilization of computing resources of the service provider network. However, workloads often utilize different amounts of computing resources over a period of time. Thus, an instance type that is optimized for hosting a workload during one period of time might be over-provisioned (e.g., allocated too many resources to adequately support the workload), or under-provisioned (e.g., allocated too few resources to adequately support the workload) in another period of time. As a specific example, a user might offer a virtual-desktop application that experiences high levels of traffic during the workday, but much lower levels of traffic in hours outside of the workday. Thus, the workloads supporting the virtual-desktop application might be on an instance type that is over-provisioned during the non-working hours of the day, which results in wasted or unused computing resources.

As noted above, service providers (or "cloud providers") may offer burstable instance types that provide a baseline level of computing resources along with the ability to burst above the baseline. However, it can be difficult for users to determine their workloads are suitable to run on burstable instances types. Thus, users may simply opt for using instances types that are over-provisioned for the majority of the life of the workload, but that can handle the bursts from the workloads to avoid throttling or other performance concerns. However, this results in waste of computing resources that are allocated to, but being unused by, instance types supporting workloads that are suitable or optimized for burstable instance types.

The techniques described herein include identifying a plurality of workloads that are successfully running on burstable instance types, and/or that have been successfully migrated to burstable instance types. The cloud-based optimization service may collect historical-utilization data for those workloads, and extract feature data from the historical-utilization data. In some instances, the optimization service may filter the historical-utilization data by removing utilization data for workloads that are running too "hot" or "warm," meaning the workloads are utilization computing resources above the baseline levels for the burstable instance types. Further, the optimization service may filter the historical-utilization data by removing utilization data for workloads that are running too "cold," meaning the workloads are running on instances that are highly over-provisioned (e.g., maximum resource utilization below 25%).

After filtering the historical-utilization data, the optimization service may generate a time series for each workload that is successfully running on a burstable instance type. For instance, the optimization service may generate a time series for a configurable period of time (e.g., one day, one week, two weeks, a month, etc.), and determine utilization values for successive time intervals within the period of time. As a specific example, the optimization service may generate a time series for 14 days of utilization data for each workload, and identify maximum utilization values of a computing resource for 5-minute intervals within the 14 days (e.g., CPU usage, memory usage, etc.).

Using the time series generated using historical-utilization data for each workload the optimization service may extract feature data from the time series. For instance, the optimization service may analyze the maximum utilization values for the success time intervals (e.g., each of the 5-minute intervals have a maximum utilization value during that interval). The optimization service may then create a vector, matrix, or other representation of various features that represent utilization characteristics of the workloads. The features represented in the vector/matrix may include various utilization characteristics that are indicative of a workload being suitable for a burstable instance type. For instance, the features may include (i) a number of utilization peaks (e.g., peaks that burst beyond the baseline), (ii) a measure of kurtosis, (iii) a measure of skewness, (iv) a median utilization value, (v) a mean utilization value, (vi) a measure of sample entropy, (vii) a utilization value for a particular quantile (e.g., 0.95 quantile, 0.90 quantile, 0.70 quantile, etc.), (viii) an absolute sum of changes, and so forth.

The optimization service may generate feature data for each workload that represents utilization characteristics over the period of time. Generally, the optimization service may generate feature data for groups of workloads that are successfully running on burstable instance types (e.g., appropriate utilization characteristics for a burstable instance type), and may generate feature data for groups of workloads that are optimized for running on fixed, or dedicated, instance types. The optimization service may utilize these two groups of different feature data and generate training data by labeling the sets of feature data with labels that indicate whether the feature data represents workloads successfully running on burstable instance types, or workloads successfully running on fixed/dedicated instance types.

The optimization service may then utilize these sets of labeled feature data (or "training data") to train one or more classification models to determine whether candidate workloads are suitable for running on burstable instance types. The classification model, or models, described herein may comprise any type of classification model, including machine-learning (ML) models, rule-based models, and/or any other type of model suitable for performing classification techniques. The ML models may be, or include, any type of ML model suitable for classification, such as random-forest models, support-vector machine (SVM) models, decision tree models, K-nearest neighbor models, stochastic gradient descent models, Naïve Bayes models, logistic regression models, and/or any type of models that can be trained using ML algorithms to perform classification techniques.

Once the classification models have been trained, the optimization service may then utilize the models to determine if candidate workloads (e.g., workloads that have not been migrated to burstable instance types) are suitable or optimized for running on burstable instance types. Using the techniques described above, the optimization service may extract feature data from resource-utilization data of the workloads, and input the feature data into the classification model. The classification model may then evaluate or analyze the feature data to determine whether the candidate workload is suited for a burstable instance type. The classification model may provide output indicating that the candidate workload is suitable or optimized for being hosted on a burstable instance type (e.g., a "1"), or is not suitable or optimized for being hosted on a burstable instance type (e.g., a "0").

In examples where the classification model determines that the candidate workload is optimized to be hosted on a burstable instance type, the optimization service may provide a recommendation to a user that their workload is suited for a burstable instance type, and/or may automatically migrate the workload to run on a burstable instance type.

As described in more detail below, the optimization service may determine specific burstable instance types that are optimized to host workloads based on resource-utilization data for the workloads in different timeframes. For instance, the optimization service may have collected resource-utilization data for the workloads, and based on the resource-utilization characteristics (or "resource-consumption characteristics") of the workloads, identify particular burstable instance types that have been allocated different amounts of computing resources, and/or different combinations of computing resources, such that the burstable instance types are optimized to support the resource-utilization characteristics of the workloads.

The techniques described herein are equally applicable for any number of instances and/or workloads. For example, a workload may be supported by an instance, by multiple instances, and/or by a fleet of instances. In some examples, one or more workloads may be supported by a fleet of instances that are scalable to support increases and/or decreases in use, and may be placed behind one or more load balancing devices of the service provider network. In such examples, the techniques described herein may be applicable to all instances in a fleet that support various instances of the same workload.

This application describes techniques that increase the overall utilization of computing resources provided by servers or other hardware devices, such as CPU, GPU, memory, disk, and/or network availability. The optimization service may determine instance types that gradually become more appropriately tailored, or allocated a more appropriate amount of computing resources, to support workloads. In this way, the techniques described herein help prevent underutilization of computing resources of a service provider network, which reduces the amount of computing resources that are (i) allocated or reserved for instances, but (ii) sit idle or unused because the instances are oversized for the workload they support. Additionally, the techniques improve the performance of workloads by intelligently placing workloads on instance types that are computationally optimized to support the workloads. The optimization service may gradually place the workloads on more optimized instances to help ensure that the workloads have sufficient amounts of computing resources available, of the types of computing resources needed, to help avoid over constrained instance types and workloads.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container, a virtual machine, a serverless network function, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network determines that a workload is optimized to be hosted on a burstable VM instance type.

As illustrated, a service provider network 102 may be operated and/or managed by a service provider 104. The service provider network 102 may provide various services to users to fulfil their computing resource needs, such as cloud-based computing resources. For example, the service provider network 102 may provide cloud-based, scalable, and network accessible compute power services, storage services, database services, and/or other services. Users may utilize user devices 108 to subscribe for use of the computing resources and/or services provided by the service provider network 102. The service provider network 102 may include an optimization service 106 that is configured to select VM instance types to support workloads of the users which optimize performance of the workloads, and refrain from underutilization or overutilization of the computing resources that support the VM instances and workloads.

Generally, the optimization service 106 may recommend optimal compute resources for users' workloads to reduce costs and improve performance by using machine learning to analyze historical utilization metrics. Over-provisioning compute can lead to unnecessary infrastructure cost and under-provisioning compute can lead to poor application performance. The optimization service 106 may help users choose optimal instance types, including those that are part of an auto scaling group, based on utilization data. By applying the knowledge drawn from running diverse workloads in the cloud (or service provider network 102), the optimization service 106 identifies workload patterns and recommends optimal compute resources. The optimization service 106 analyzes the configuration and resource utilization of a user's workload to identify dozens of defining characteristics, for example, if a workload is CPU-intensive, or if it exhibits a daily pattern or if a workload accesses local storage frequently. The optimization service 106 processes these characteristics and identifies the hardware resource headroom required by the workload. The optimization service 106 infers how the workload would have performed on various hardware platforms (e.g. VM instances types) and offers recommendations. Users can opt-in to the optimization service 106 via a console.

The service provider network 104 may span across different geographic regions, and include or be associated with a distributed computing network 110 that includes clusters of managed computing devices 112 (e.g., servers) stored in data centers located across the different geographic regions. In this way, users who have subscribed for use of the network-based services supported by computing resources in the data centers need not invest in and maintain the computing infrastructure required to implement the various services that they may need. In some examples, users of the service provider network 102 may access or utilize computing resources of the computing devices 112 in the data centers located in different geographic regions such that users located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the distributed computing network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), serverless functions, logical data storage volumes capable of storing files and other data, software programs, data processing services, and the like.

As illustrated, the computing devices 112 may each support VM instances that may be different types of VM instances provided by the service provider network 102. For instance, computing devices 112(1) may support one or more VM instances 114(1)-114(N) that are of a first VM instance type, and computing devices 112(2) may support one or more VM instances 116(1)-116(N) that are of a second VM instance type. Rather than allocating all the computing resources of an entire computing device 112 to support a workload for the user, the service provider network may include a virtualization layer (e.g., containing one or more hypervisors) that includes instances of "virtual" computing resources (also referred to interchangeably herein as "virtual machines" or "VM instances") that represent allocated portions of the physical computing resources of the computing devices 112. These VM instances 114/116 may emulate computing devices 112 to operate and support workloads, and may have their own operating systems, processing capabilities, storage capacity, and network connections or interfaces.

Users may create user accounts with the service provider 104 to utilize the resources and services of the service provider network. The users may utilize their user devices 108 to communicate over one or more networks 118 (e.g., WANs, PANs, LANs, etc.) with the service provider network 102. The user devices 108 may comprise any type of computing device configured to communicate over network(s) 118, such as mobile phones, tablets, laptop computers, desktop computers, televisions, servers, and/or any other type of computing device. The users may desire that the service provider network 102 host or support workloads on the distributed computing network 110 that is managed by the service provider 104. Accordingly, the users may, via their user account, request that a workload be launched on their behalf, and provide workload data via one or more user portals 122 (e.g., web console, command line interface (CLI), application programming interface (API), etc.). The user portals 122 may provide the workload data to the optimization service 106 which includes a recommendation engine 124, an optimization component 126, and a VM instance type library 128 storing indications of different VM instance types offered by the service provider network 102.

As illustrated, the VM instance type library 128 may store one or more fixed VM instance types 130 (also called "non-burstable" or "dedicated" instances), where each VM instance type 130 is allotted and guaranteed a fixed quantity of resources. Further, the VM instance type library 128 more store one or more burstable VM instance types 132, where each burstable VM instance type 132 provides baseline levels of computing resources along with the ability to periodically or intermittently burst above the baseline. In some instances, the service provider network 102, such as a cloud provider network, may offer instances 130/132 with varying computational and/or memory resources, which are managed by a compute virtualization service (referred to in various implementations as a compute-management service, an elastic compute service, a virtual machines service, a computing cloud service, a compute engine, or a cloud compute service).

In one embodiment, each of the virtual compute instances 130/132 may correspond to one of several instance types or families. An instance type 130/132 may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type 130/132 can have a specific ratio of processing, local storage, memory, and networking resources, and different instance families may have differing types of these resources as well. Multiple sizes of these resource configurations can be available within a given instance type 130/132. Using instance type 130/132 selection functionality, an instance type 130/132 may be selected for a user, e.g., based (at least in part) on input from the user. For example, a user may choose an instance type 130/132 from a predefined set of instance types 130/132. As another example, a customer may specify the desired resources of an instance type 130/132 and/or requirements of a workload that the instance will run, and the instance type 130/132 selection functionality may select an instance type based on such a specification.

As described herein, a workload 136 may generally include a designated collection or grouping of computing resources (e.g., compute, memory, storage, networking, etc.) in the distributed computing network 110, and the code or logic that performs functionality using the computing resources. The service provider network 102 may support a wide variety of workloads 136, such as web servers, databases, customer-facing applications, distributed data stores, batch processing, machine/deep learning training and/or inference, online gaming, video encoding, memory caching, and/or any other type of workload that can be supported by computing resources of the distributed computing network 110.

The optimization service 106 includes the optimization component 126 that is configured to determine VM instance types 130/132 that are optimized to support the workload 136 on behalf of the user. The service provider 102 may offer a wide variety of VM instance types 130 that differ based on (i) the amounts of physical computing resources allocated for use by the VM instance type 130/132, and/or (ii) the combinations of the types of physical computing resources allocated for use by the VM instance types 130/132. In some instances, there may be at least five high-level categories or types of computing resources included in the distributed computing network 110 and provided by the computing devices 112, which are CPU, GPU, memory, storage, and network throughput. The different VM instance types 130/132 are allocated different amounts and/or combinations of these, and potentially other, computing resources. For example, the VM instance types 130/132 may be allocated use of larger or smaller amounts of the different resource types to be computationally optimized support workloads 136 with various computing resource utilization characteristics.

For example, the VM instance types 130/132 can include compute optimized types, memory optimized types, accelerated optimized types, storage optimized types, and/or network throughput optimized types. As a specific example, a VM instance type 130/132 that is compute optimized may be allocated use of 4 vCPUs of 3.0 GHz processors where each core can run at up to 3.5 GHz, but only be allocated 8 gibibytes (GiB) of memory. Conversely, a VM instance type 130/132 that is memory optimized may be allocated 32 GiB of memory, but only run on a 3.1 GHz processor with 2 vCPUs.

In addition to optimizing the VM instance types 130/132 by varying the amounts or ratios of computing resource types allocated for use by the different VM instance types 130/132, the service provider 104 may further include different sizes of VM instance types 130/132 for workloads 136 that require more or less computing resources at various ratios. For example, a smaller VM instance type 130/132 that is computationally optimized may be allocated 2 vCPUs of a 3.0 GHz processor and 4 GiB of memory, and an extra-large VM instance type 130/132 that is computationally optimized may be allocated 72 vCPUs on the 3.0 GHz processor and 144 GiB of memory (e.g., 36× the vCPUs and memory allocation of the smaller type). Accordingly, the service provider 104 may offer a wide selection of VM instance types 130/132 that are included in the VM instance type library 128 in which a user can search and select a desired VM instance type 130/132 for their workload 136.

In the illustrative example, a user of a user device 108 may have provided input via the user portal 122 to cause their workload 136 to be hosted on a VM instance 114. In this example, the VM instance 114 may be of a fixed VM instance type 130 and be allocated or provided with guaranteed, fixed amounts of computing resources for the workload 136 to utilize. Although illustrated as a single workload 136 running on a VM instance 114, there may be a fleet of workloads running on a fleet of VM instances 114 in the distributed computing network 110. The optimization component 126 may collect resource-utilization data 138 for the workload 136 running on the VM instance 114.

Generally, the resource-utilization data 138 may indicate amounts of computing resources (e.g., CPU, memory, storage, network resources, etc.) utilized by the workload 136 while hosted on the VM instance 114. The resource-utilization data 138 may be collected over a period of time (e.g., one day, one week, two weeks, one month, etc.), and represent values indicative of consumption or utilization of physical resources of the distributed computing network 110 being utilized by the workload 136.

The optimization component 126 may be configured to determine an optimized VM instance type 130/132 for the workload 136 based on the resource-utilization data 138. In some instances, the optimization component 126 may determine whether the workload 136 is optimized to be hosted on a fixed VM instance type 130 or a burstable VM instance type 132. To do so, the optimization component 126 may utilize one or more classification models 120 to determine whether the workload 136 is suitable or optimized to run on a burstable VM instance type 132. Generally, workloads are suitable or optimized to run on burstable VM instance types 132 if the workloads utilize relative low amounts of computing resources, and periodically or intermittently burst above these low, baseline utilization levels.

The classification model(s) 120 described herein may comprise any type of classification model 120, including machine-learning (ML) models, rule-based models, and/or any other type of model suitable for performing classification techniques. The ML models may be, or include, any type of ML model suitable for classification, such as random-forest models, support-vector machine (SVM) models, decision tree models, K-nearest neighbor models, stochastic gradient descent models, Naïve Bayes models, logistic regression models, and/or any type of models that can be trained using ML algorithms to perform classification techniques. Techniques for training the classification model(s) 120 can be found below with reference to at least FIGS. 4 and 5.

Once the classification model(s) 120 have been trained, the optimization service 106 may then utilize the models 120 to determine if the candidate workload 136 is suitable or optimized for running on burstable instance types 132. Using the techniques described above, the optimization service 106 may extract feature data from resource-utilization data 138 of the workloads, and input the feature data into the classification model 120. The classification model 120 may then evaluate or analyze the feature data to determine whether the workload 136 is suited for a burstable instance type 132. The classification model 120 may provide output 140 indicating that the workload 136 is suitable or optimized for being hosted on a burstable instance type 132 (e.g., a "1"), or is not suitable or optimized for being hosted on a burstable instance type 132 (e.g., a "0").

In examples where the classification model 120 determines that the candidate workload 136 is optimized to be hosted on a burstable instance type 132, the recommendation engine 124 may provide recommendation data 142 to a user of the user device 108 that indicates a burstable instance type recommendation 144. The recommendation 144 may indicate resource-utilization characteristics 146 of the workload 136 as well to help illustrate that their workload 136 is suited for a burstable instance type 132.

The user may then provide input indicating a request to migrate the workload 136 from running on VM instances 114 of the fixed VM instance type 130 to run on VM instances 116 of the burstable VM instance type 132. In some instances, the user may have opted in to allow the optimization service 106 to automatically optimize the placement of their workloads 136 on VM instances 114/116. In such instances, the optimization service 106 may automatically cause the workload 136 to be migrated on VM instances 116 of the burstable VM instance type 132. In either scenario, the optimization server 106 may cause the workload 136 to be migrated at 148 to the VM instance 116 that is of the burstable VM instance type 132.

To migrate the workload 136 at 148, the optimization service 106 may provide a compute-management service 134 an instruction to migrate the workload 136 on one or more (e.g., a fleet) of VM instances 116 that correspond to a burstable VM instance types 132. In some examples, the workload 136 may include code provided by the user, and/or generated by the service provider network 102, to implement functionality of the desired workload 136. For example, the service provider network 102 may provide services that generate code for the workload 136, including an application stack and/or other programs, to implement the workload 136. The workload 136 may be supported by one VM instance 116, and/or a fleet of VM instances 116. In some examples, one or multiple VM instances 116 in a fleet of VM instances 116 may support respective workloads 136 on behalf of the user account of the user. The compute-management service 134 may further deploy one or more load balancers in front of the fleet of VM instances 116 to scale the workload(s) 136, and other configurations or devices (e.g., security groups) to support the workload.

Generally, the optimization service 106, and components thereof, may comprise software, firmware, and/or other logic that is supported one computing device, or across more computing devices in the service provider network 102. Additionally, the optimization service 106 may comprise a system of other devices, such as software agents stored locally on VM instances 114/116.

Figure 2:
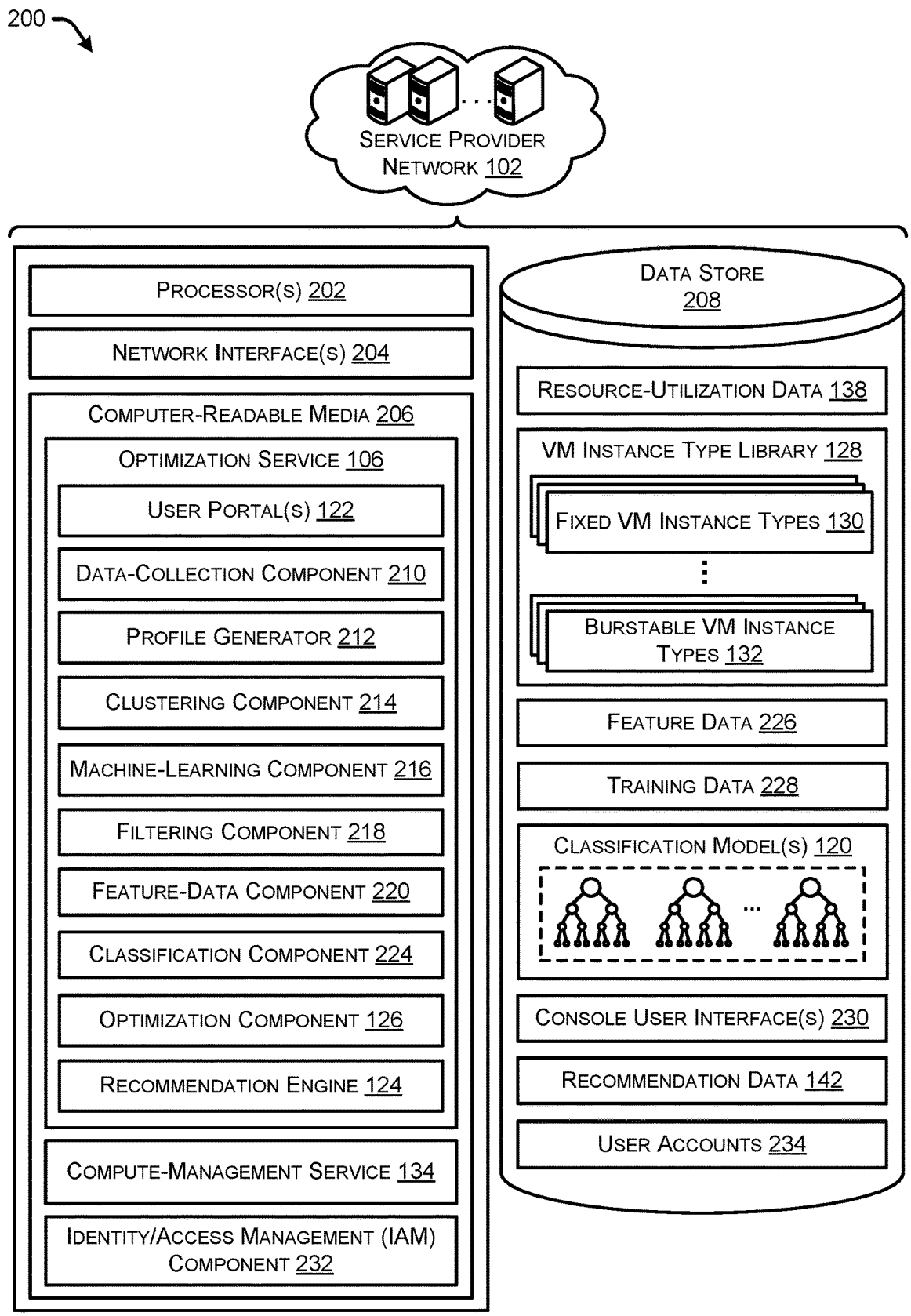
FIG. 2 illustrates a component diagram of example components of a service provider network that determines that a workload is suitable and/or optimized to be hosted on a burstable VM instance type, and provides recommendations to users to migrate their workloads to the burstable VM instance type.

FIG. 2 illustrates a component diagram of example components 200 of a service provider network 102 that determines that a workload 136 is optimized to be hosted on a burstable VM instance type 132, and provides recommendations to a user to migrate their workload 136 to the burstable VM instance type 132.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108, computing devices 112, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 106 described herein. For instance, the computer-readable media 206 may further store the user portal(s) 122 through which users can provide input via their user accounts and user devices 108. In some examples, the user portal(s) 122 include an interface through which users can provide input data. The user portal(s) 122 may include the web-console wizard which presents one or more console user interface(s) (or UIs) through which the users may provide input data that defines or describes preferences for hosting their workloads 136.

The computer-readable media 206 may further store a data-collector component 210 configured to collect and store the resource-utilization data 138. In some instances, the data-collector component 210 may continuously, or periodically, collect the resource-utilization data 138 from the VM instances 114/116 running workloads 136. The data-collector component 210 may work in conjunction with a software agent running locally on the VM instances 114/116 in order to collect the resource-utilization data 138.

The computer-readable media 206 may further store a profile generator 212 that generates a snapshot of profiling data, such as a resource-utilization characteristic included in the resource-utilization data 138, at regular intervals. The profile generator 212 may then utilize these snapshots to create a resource fingerprint for a workload 136, which generally represents the resource consumption of the workload 136. These fingerprints or profiles may be included in the resource-utilization data 138 and be mapped to VM instance types 130/132 and/or workload categories for the workload 136. The profile generator 212 may further accumulate and average all resource-utilization data 138 for a fleet of VM instances 114/116 in order to generate a consumption fingerprint for a fleet of VM instances 114/116.

The computer-readable media 206 may further store a clustering component 214 configured to create or generate the workload categories. The clustering component 214 may obtain historical (or near-real time) utilization data 138 and cluster the workloads 136 for some or all of the user accounts of the service provider network 102 to generate the workload categories that are generally representative of all the workloads 136 in the service provider network 102.

The computer-readable media 206 may further store a machine-learning (ML) component 216 configured to generate the resource-utilization models for each of the workload categories. The ML component 216 may perform various techniques, and utilize various ML algorithms, to train one or more resource-utilization models that represent resource-utilization characteristics representative of the workloads 136 in each workload category. In this way, when a new workload 136 needs to be categorized for purposes of identifying optimized VM instance types 130/132, the resource-utilization data 138 for the new workload 136 may be mapped to the resource-utilization model that is "closest" or "most near" (e.g., neural network models) the fingerprint of the resource-utilization data 138 for the new workload 136. The ML component 216 may utilize any type of ML algorithm or technique to train the resource-utilization models.

The computer-readable media 206 may further store the optimization component 126 configured to perform techniques described above for mapping resource-utilization data 138 to the appropriate workload categories, such as machine-learning methods or ruled based methods. For example, the optimization component 126 may compare utilization by the workload 136 for one or more dimensions of compute (e.g., CPU, GPU, memory, disk, and/or network throughput) with the resource-utilization models to identify closest match across the one or more dimensions of compute. The optimization component 126 may further determine which of the VM instance identifiers are associated with the workload categories, and provide the user(s) with indications of the optimized VM instance types 130 that are optimized for their workload 136.

The computer-readable media 206 may further store the recommendation engine 124 that is configured to generate and provide recommendation data 142 to the user device 108 to recommend VM instance types 130/132 on which to host workloads 136. The recommendation engine 124 may generate recommendation data 142 including a recommendation of a burstable VM instance type 132, suitability/risk scores that indicate how suitable or optimized a VM instance type 132 is for the workload 136, and/a textual explanation that details why a VM instance type 132 is optimized for the workload 136. The recommendation engine 124 may, if the user opts in for a recommendation, provide recommendation data 142 to the user devices 108 to help users gradually move their workloads 136 to move optimized VM instance types 132, such as burstable VM instance types 132.

The computer-readable media 206 may further store a filtering component 218 that is configured to filter the resource-utilization data 138 (e.g., historical utilization data) collected by the data-collection component 210. The data-collection component 210 may collect historical-utilization data 138 for workloads 136 successfully running on burstable VM instance types 132, and may filter the historical-utilization data 138 by removing utilization data 138 for workloads 136 that are running too "hot" or "warm," meaning the workloads 136 are utilization computing resources above the baseline levels for the burstable instance types 132. Further, the filtering component 218 may filter the historical-utilization data 138 by removing utilization data 138 for workloads 136 that are running too "cold," meaning the workloads 136 are running on instances that are highly over-provisioned (e.g., maximum resource utilization below 25%).

The computer-readable media 206 may further store a feature-data component 220 that is configured to extract feature data 226 from the filtered resource-utilization data 138. The feature-data component 220 may generate a time series for each workload 136 that is successfully running on a burstable instance type 132. For instance, the feature-data component 220 may generate a time series for a configurable period of time (e.g., one day, one week, two weeks, a month, etc.), and determine utilization values for successive time intervals within the period of time. As a specific example, the feature-data component 220 may generate a time series for 14 days of utilization data for each workload 136, and identify maximum utilization values of a computing resource for 5-minute intervals within the 14 days (e.g., CPU usage, memory usage, etc.).

Using the time series generated using historical-utilization data 138 for each workload 136, the feature-data component 220 may extract feature data 226 from the time series. For instance, the feature-data component 220 may analyze the maximum utilization values for the success time intervals (e.g., each of the 5-minute intervals have a maximum utilization value during that interval). The feature-data component 220 may then create a vector, matrix, or other representation of various features that represent utilization characteristics of the workloads 136. The features represented in the vector/matrix may include various utilization characteristics that are indicative of a workload 136 being suitable for a burstable instance type. For instance, the features may include (i) a number of utilization peaks (e.g., peaks that burst beyond the baseline), (ii) a measure of kurtosis, (iii) a measure of skewness, (iv) a median utilization value, (v) a mean utilization value, (vi) a measure of sample entropy, (vii) a utilization value for a particular quantile (e.g., 0.95 quantile, 0.90 quantile, 0.70 quantile, etc.), (viii) an absolute sum of changes, and so forth.

The feature-data component 220 may generate feature data 226 for each workload 136 that represents utilization characteristics over the period of time. Generally, the feature-data component 220 may generate feature data 226 for groups of workloads that are successfully running on burstable instance types (e.g., appropriate utilization characteristics for a burstable instance type), and may generate feature data 226 for groups of workloads 136 that are optimized for running on fixed, or dedicated, instance types 130. The feature-data component 220 may utilize these two groups of different feature data 226 and generate training data 228 by labeling the sets of feature data 226 with labels that indicate whether the feature data 226 represents workloads 136 successfully running on burstable instance types 132, or workloads 136 successfully running on fixed/dedicated instance types 130.

The computer-readable media 206 may further store a classification component 224 configured to perform techniques for training and utilization classification models 120. For instance, the classification component 224 may utilize sets of labeled feature data 226, or the training data 228, to train the one or more classification models 120 to determine whether candidate workloads 136 are suitable for running on burstable instance types 132. The classification model 120, or models, described herein may comprise any type of classification model 120, including machine-learning (ML) models, rule-based models, and/or any other type of model suitable for performing classification techniques. The ML models may be, or include, any type of ML model suitable for classification, such as random-forest models, support-vector machine (SVM) models, decision tree models, K-nearest neighbor models, stochastic gradient descent models, Naïve Bayes models, logistic regression models, and/or any type of models that can be trained using ML algorithms to perform classification techniques.

Once the classification models 120 have been trained, the classification component 224 may then utilize the models 120 to determine if candidate workloads 136 (e.g., workloads that have not been migrated to burstable instance types) are suitable or optimized for running on burstable instance types 132. Using the techniques described above, the feature-data component 220 may extract feature data 226 from resource-utilization data 138 of the workloads 136, and input the feature data 226 into the classification model 120. The classification model 120 may then evaluate or analyze the feature data 226 to determine whether the candidate workload 136 is suited for a burstable instance type 132. The classification model 120 may provide output indicating that the candidate workload 136 is suitable or optimized for being hosted on a burstable instance type 132 (e.g., a "1"), or is not suitable or optimized for being hosted on a burstable instance type (e.g., a "0").

The computer-readable media 206 may further store code for the compute-management service 134, which may be implemented by one, or multiple, computing devices 112 of the service provider network 102. Generally, the compute-management service 134 may be a service of the service provider network 102 that provides secure, resizable compute capacity and manages the computing resources of the distributed computing network 110. The compute-management service 134 may be referred to in various implementations as an elastic compute service, a virtual machines service, a computing cloud service, a compute engine, or a cloud compute service. In some examples, the compute-management service 134 may perform various functions for managing the distributed computing network 110, such as provisioning VM instances 114, migrating workloads 136 between VM instances 114/116, providing auto-scaling for fleets of VM instances 114, configuring VM instances 114 and/or workloads 136, and/or performing any other functions for managing the distributed computing network 110. In some instances, the compute-management service 134 may receive commands from the optimization service 106 for managing the workloads 136 and/or VM instances 114/116 for users of the service provider network 102.

In some examples, the compute-management service 134 may include an auto-scaling component that, when executed by the processor(s) 202, scales up or down the number of instances 116 available to support one or more workloads 136. For example, the auto-scaling component may provide a fast, efficient, and accurate way to match fleet capacity to usage. In some examples, the auto-scaling component may track the fleet's hosting metrics and determine when to add or remove instances 116 based on a set of guidelines, called policies. The auto-scaling component can adjust capacity in response to changes in demand to help ensure that the fleet of instances 116 has availability for bursts without maintaining an excessive amount of idle resources.

To utilize the services provided by the service provider network 102, users may register for an account with the service provider network 102. For instance, users may utilize a user device 108 to interact with an identity and access management (IAM) component 232 that allows the users to create user accounts 234 with the service provider network 102. Generally, the IAM component 232 may enable the users to manage their workloads 136 and other computing resources securely. Using the IAM component 234, the users may manage their VM instances 114/116 as described herein. Additionally, users may perform various operations for interacting with the optimization service 106 via their user accounts 234, such as providing input data, receiving recommendation data 142, proving input data indicating selections of VM instance types 130/132, and/or other interactions may be authorized via credentials required to access the user accounts 234.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
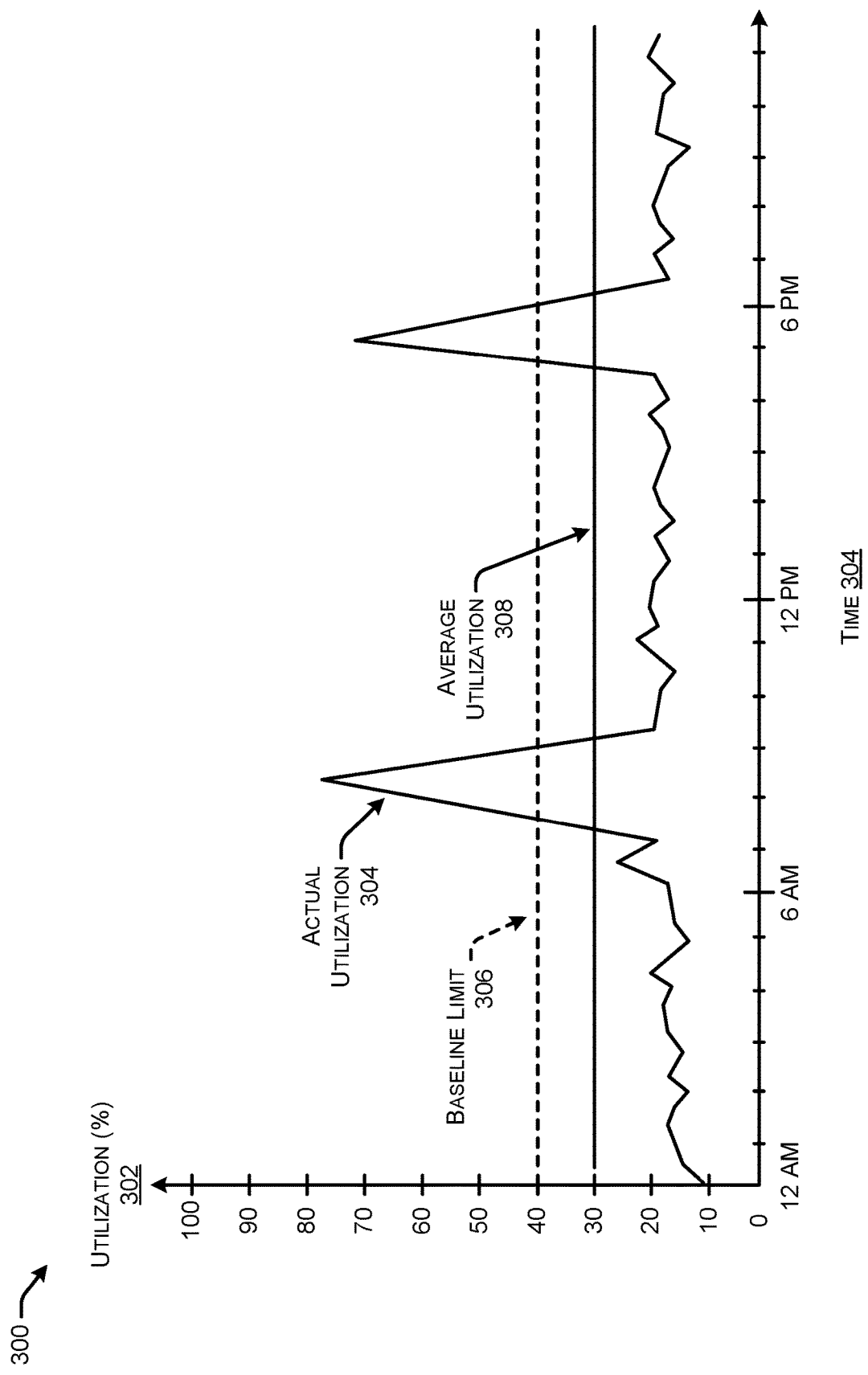
FIG. 3 illustrates a graph of an example resource-utilization rate of a workload that is suitable and/or optimized to be hosted on a burstable VM instance type.

FIG. 3 illustrates a graph 300 of an example resource-utilization rate of a workload 136 that is optimized to be hosted on a burstable VM instance type 132.

As illustrated, the graph includes a y-axis on which utilization 302 is plotted as a function of percentages, and an x-axis on which time 304 is plotted with hourly increments. As shown, the actual utilization 304 of the workload 136 is fairly low and consistent for the majority of the day that is plotted. For instance, the utilization percentage of the illustrated computing resource (e.g., compute, memory, storage, etc.) is generally below a baseline limit 306 that is allocated for the workload 136, or below 40%. However, the actual utilization 304 may spike or burst over the baseline utilization 306 at various points in the day to relatively high utilization rates (e.g., 80% utilization), such as around 8 am and 5 pm. As illustrated, the actual utilization 304 may spike twice in the day, but otherwise stays below the baseline limit 306. Thus, the average utilization 308 is roughly 30% for the workload 136, putting it below the baseline limit 306, but occasionally bursts above the baseline limit 306. The actual utilization 304 illustrated in FIG. 3 is an example of a workload 136 that may be optimized to run on a virtual instance 116 of a burstable instance type 132.

Figure 4:
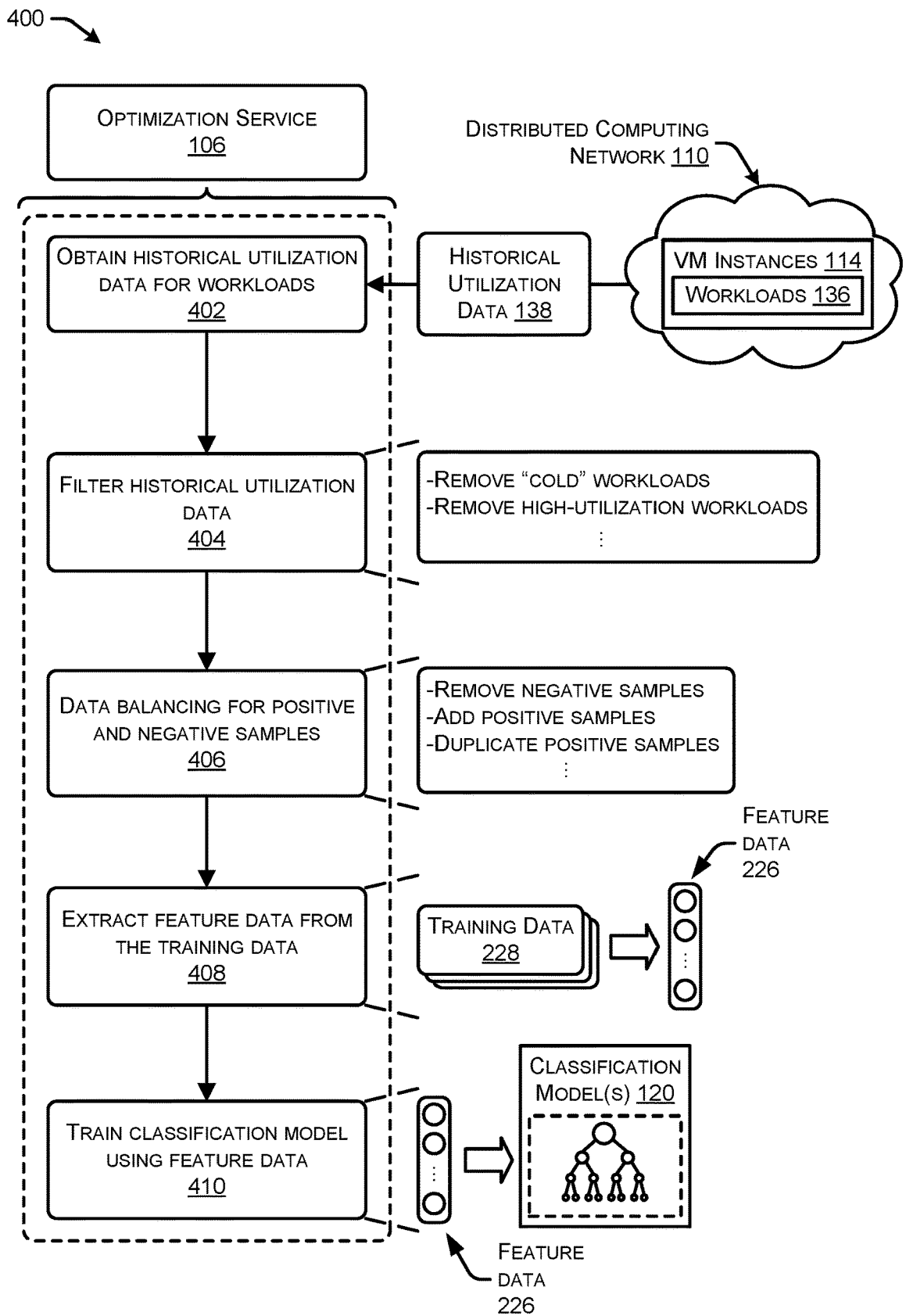
FIG. 4 illustrates a flow diagram of an example process for an optimization service to obtain historical utilization data from workloads, extract feature data from the historical utilization data, and use the feature data to train a classification model to identify workloads as being suitable and/or optimized for running on burstable VM instance types.

FIG. 4 illustrates a flow diagram 400 of an example process for an optimization service 106 to obtain historical utilization data 138 from workloads 136, extract feature data 226 from the historical utilization data 138, and use the feature data 226 to train a classification model 120 to identify workloads 136 as being optimized for running on burstable VM instance types 132.

At 402, the optimization service may obtain historical utilization data for workloads. For instance, the data-collection component 210 may obtain historical utilization data 138 for a plurality of workloads 136 that are hosted on different instances 114/116 in the distributed computing network 110.

At 404, the optimization service may filter the historical-utilization data 138. For instance, the filtering component 218 may filter the historical-utilization data 138 by removing utilization data 138 for workloads 136 that are high-utilization workloads, meaning the workloads 136 are utilization computing resources above the baseline levels for the burstable instance types 132. For instance, high-utilization workloads would be workloads that consume high amounts of computing resources, and would not be good fits for burstable instance types 132. Further, the filtering component 218 may filter the historical-utilization data 138 by removing utilization data 138 for workloads 136 that are running too "cold," meaning the workloads 136 are running on instances that are highly over-provisioned (e.g., maximum resource utilization below 25%).

At 406, the optimization service 106 may balance positive and negative samples of burstable workloads. For instance, the classification component 224 may remove negative samples (e.g., workloads 136 running successfully on fixed instance types 130), add positive samples (e.g., add workloads 136 running successfully on burstable instance types 132), and/or duplicate positive samples (e.g., duplicate samples of workloads 136 running successfully on burstable instances types 132).

At 408, the optimization service 106 may extract feature data from the training data. For instance, the feature-data component 220 may extract feature data 226 from training data 228 that is used for training the classification models 120.

At 410, the optimization service may train the classification model using the feature data. For instance, the classification component 224 may utilize the training data 228 to train the classification model(s) 120 to receive utilization data 138 for candidate workloads 136, and determine whether the candidate workloads 136 would be suitable or optimized for burstable instance types 132.

Figure 5:
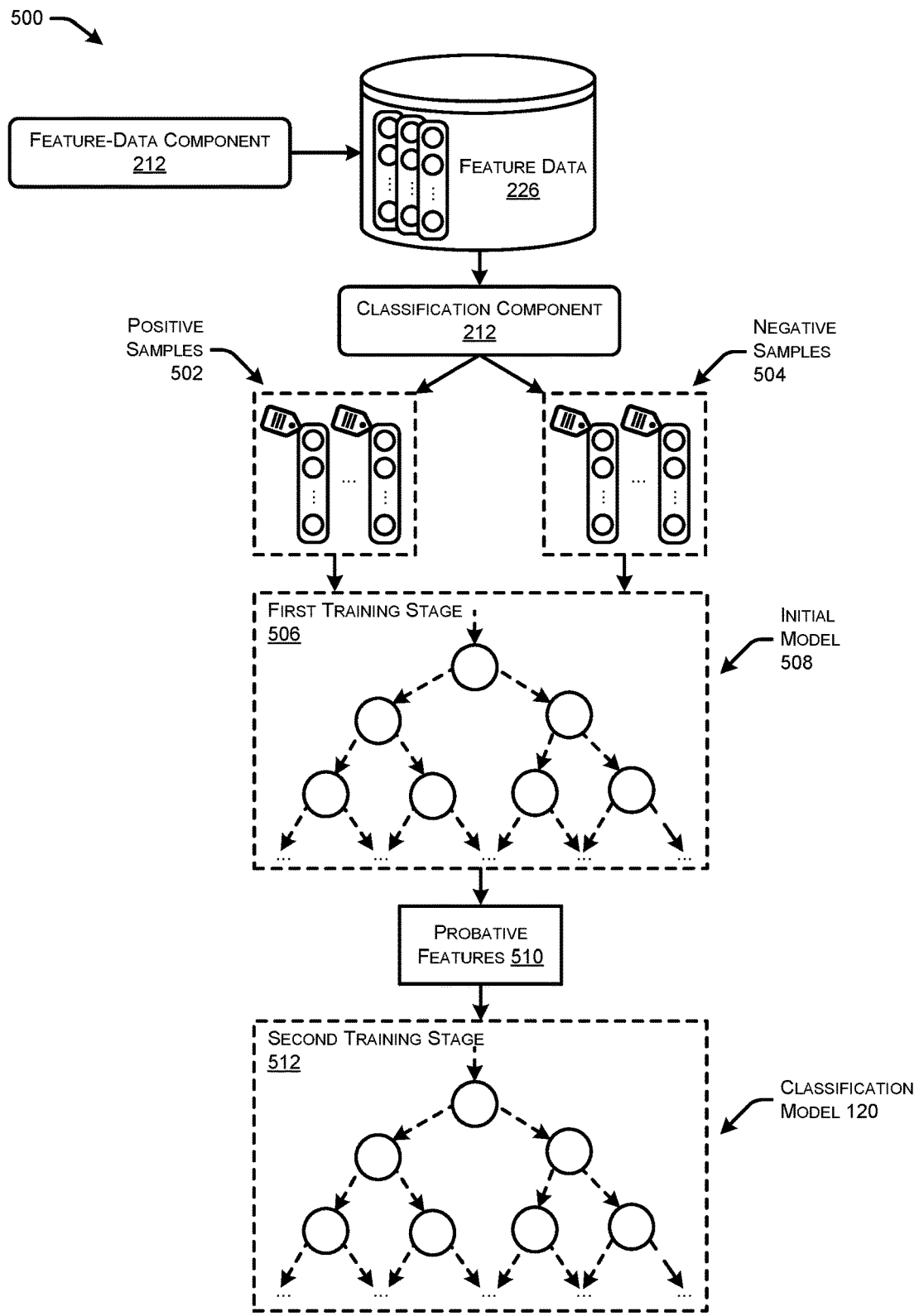
FIG. 5 illustrates a flow diagram of an example process for training a classification model to identify workloads as being suitable and/or optimized for running on burstable VM instance types.

FIG. 5 illustrates a flow diagram of an example process 500 for training a classification model 120 to identify workloads 136 as being optimized for running on burstable VM instance types 132.

As illustrated, the feature-data component 212 may generate and store feature data 226 usable by the classification component. Generally, the feature data 226 may represent utilization characteristics of a plurality of workloads 136 over a period of time. The feature-data component 212 may generate feature data 212 for groups of workloads 136 that are successfully running on burstable instance types 132 (e.g., appropriate utilization characteristics for a burstable instance type), and may generate feature data 226 for groups of workloads 136 that are optimized for running on fixed instance types 130. The classification component 212 may obtain the feature data 226, and may utilize these two groups of different feature data 226 and generate training data by labeling the sets of feature data 226 with labels that indicate whether the feature data 226 represents workloads 136 successfully running on burstable instance types 132, or workloads 136 successfully running on fixed/dedicated instance types 130. Thus, the classification component 212 may generate or create positive samples 502 that indicate good examples of burstable workloads, (e.g., feature data 226 representing burstable workloads) and negative samples 504 that indicate workloads which are not suitable for burstable instance types 132 (e.g., feature data 226 representing fixed workloads).

The burstable samples 502 and fixed samples 504 may be used in a first training state 506 to train an initial model 508. In some instances, all of the feature data 226 may be used in the first training state 506 to train the initial model 508. Generally, any type of training algorithm, such as ML algorithms, may be used to train the initial model 508 based on the type of model 508 being utilized for classification.

After the first training stage 506, the classification component 212 may determine probative features 510 used to train the initial model 508. That is, the classification component 212 may identify what features are most probative, or indicative, of a workload 136 being suitable for a burstable instance type 132.

In the second training stage 512, the classification component 212 may use only the probative features 510 to train the classification model 120. That is, the initial model 508 may be fine-tuned in the second training stage 512 by training the initial model 508 with the probative features 510 to result in the classification model 120.

Figure 6A:
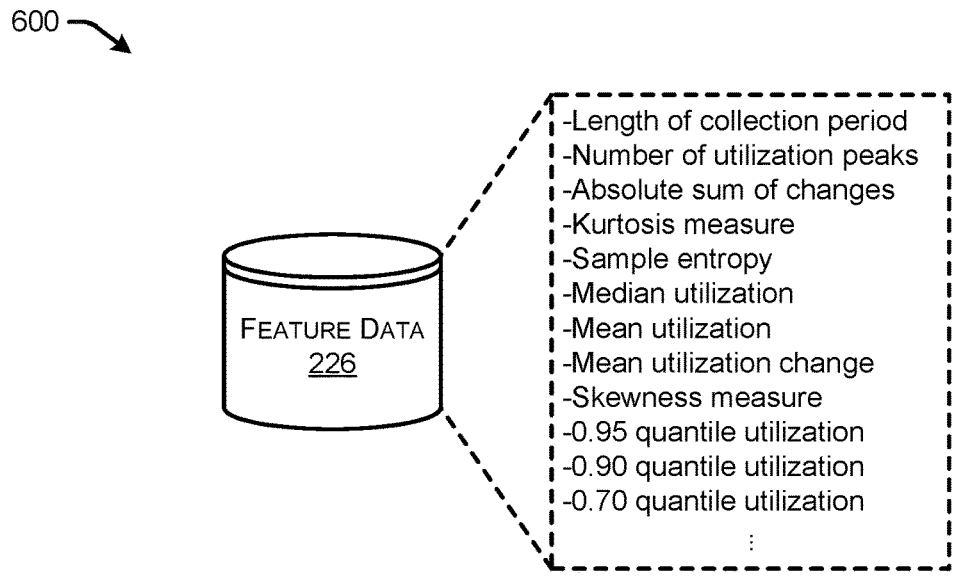
FIG. 6A illustrates an example listing of feature data used for training a classification model.

FIG. 6A illustrates an example listing of feature data 226 used for training a classification model 120. As shown, the feature data 226 may include features such as a length of the collection period (e.g., one day, one week, one month, etc.), a number of utilization peaks within the collection period (e.g., how many times utilization exceeds the baseline allocation), an absolute sum of the changes in the utilization values, and a Kurtosis measure. Further, the feature data 226 may include an indication of the sample entropy (e.g., degree of disorder or randomness in the utilization data), a median utilization value, a mean utilization value, and a mean utilization change. Further, the feature data 226 may include a skewness measure, and various quantile utilization values (e.g., 0.95, 0.90, 0.75, etc.). However, additional features, less features, different features, and/or any combination thereof may be utilized where the features are indicative as to whether or not a workload 136 is suitable for a burstable instance type 132.

Figure 6B:
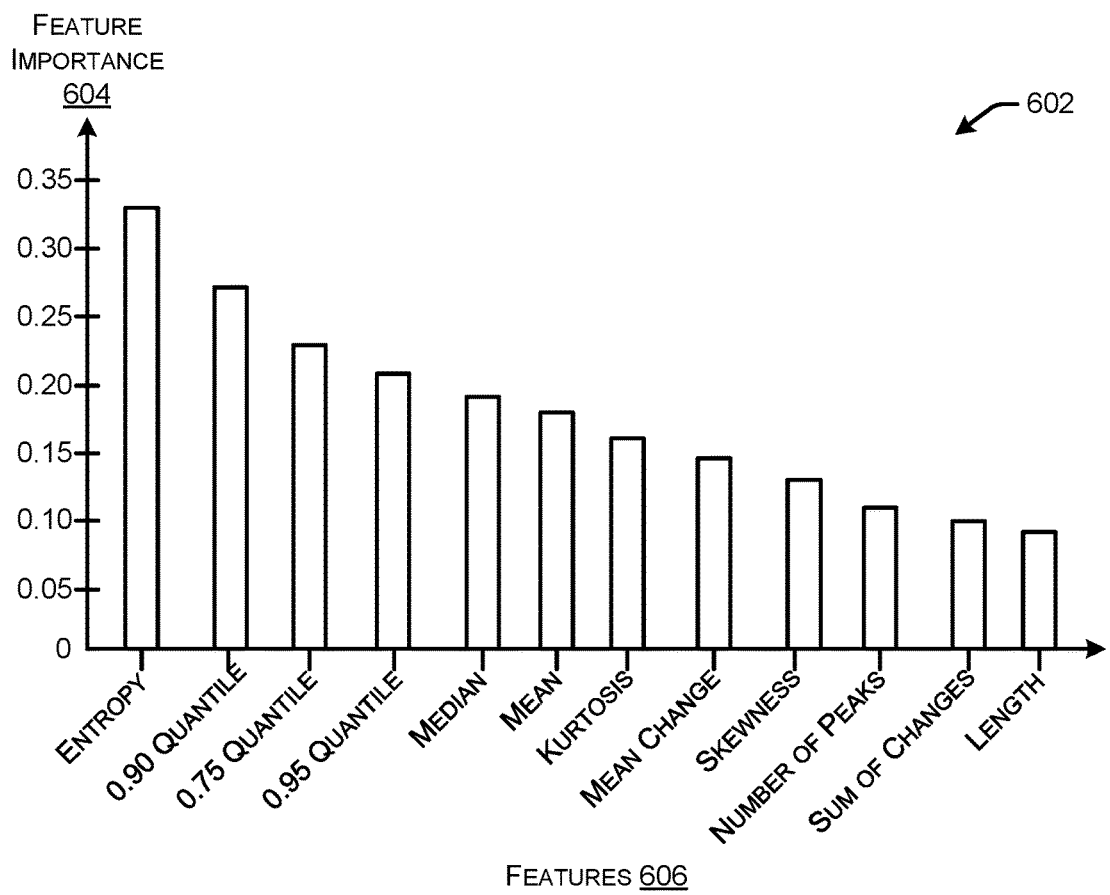
FIG. 6B illustrates an example graph on which features are plotted based on the weighting factors applied to each feature, where the weighting factors indicate importance of the features.

FIG. 6B illustrates an example graph 602 on which features are plotted based on the weighting factors applied to each feature, where the weighting factors indicate importance of the features. As illustrated, the y-axis represents feature importance 604 and the x-axis represents different features 606. Generally, the higher the feature importance 604, the more indicative or probative the feature 606 is for determining whether or not a workload 136 is suitable or optimized for being hosted on a burstable instance type 132. When training the models 120, the features 606 indicated as being more important may be preferred and/or included in the probative features 510. The values in FIG. 6B are merely illustrative, and any values or features 606 may be presented or used.

Figure 7:
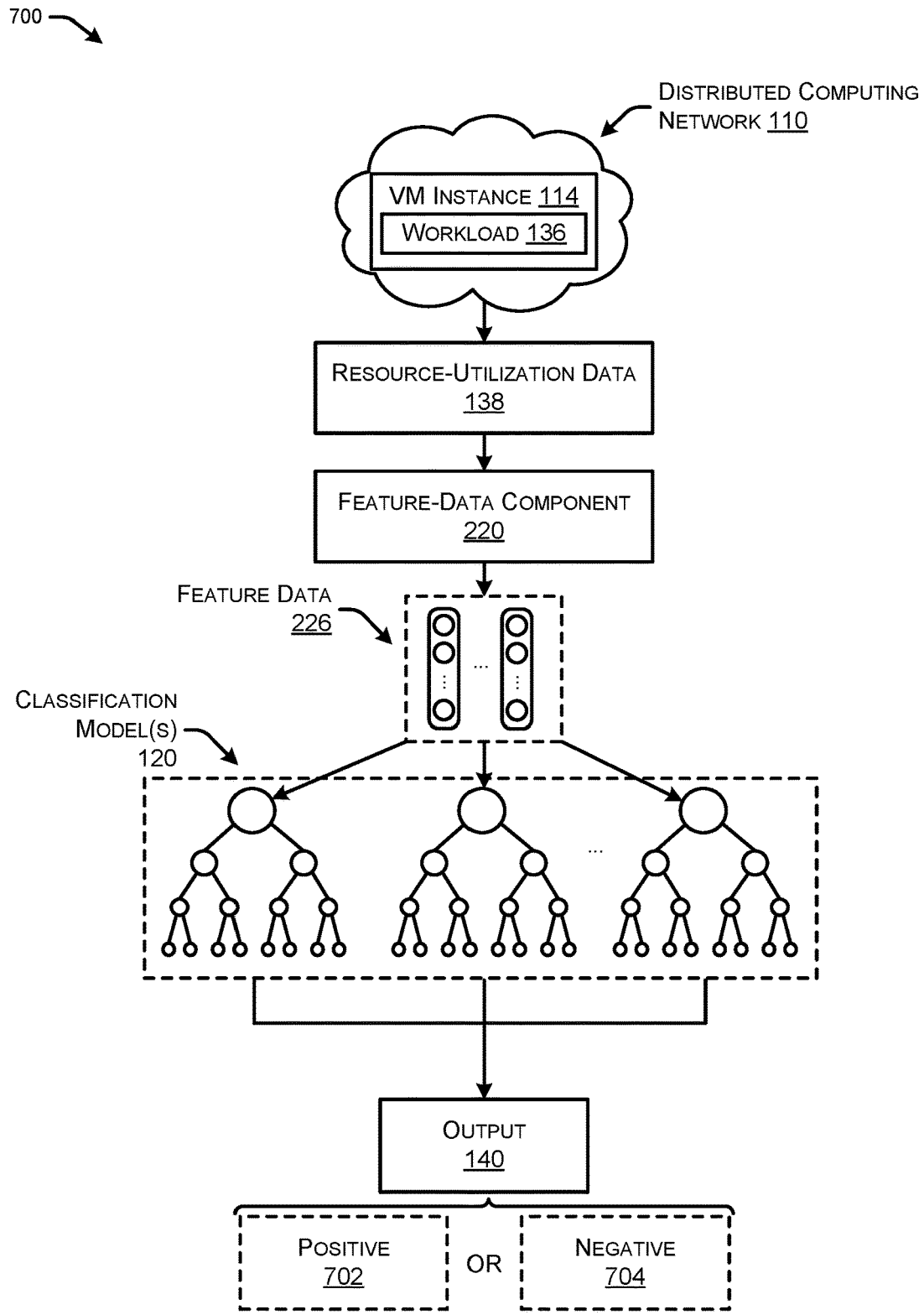
FIG. 7 illustrates a flow diagram of an example process for extracting feature data from utilization data of a workload, inputting the feature data into one or more classification models, and receiving output from the classification model(s) that indicates whether the workload would be suitable and/or optimized running on a burstable VM instance type.

FIG. 7 illustrates a flow diagram of an example process 700 for extracting feature data 226 from utilization data 138 of a workload 136, inputting the feature data 226 into one or more classification models 120, and receiving output from the classification model(s) 120 that indicates whether the workload 136 would be optimized running on a burstable VM instance type 132.

As shown, and described herein, the feature-data component 220 may receive resource-utilization data 138 for a candidate workload 136 running on a VM instance 114 in a distributed computing network 110. The feature-data component 220 may extract feature data 226 from the resource-utilization data 138. The feature data 226 may represent utilization characteristics of the workload 136, and may be fed as input into the classification model(s) 120. The classification models 120 may then analyze or evaluate the utilization characteristics of the candidate workload 136 to determine whether the utilization characteristics are more similar to other workloads 136 that successful run on burstable instance type 132, or more similar to workloads 136 that run on fixed instance types 130.

The model(s) 120 may provide output 140, based on the analysis of the feature data 226 of the candidate workload 136, that indicates whether the workload 136 has been determined to be a positive 702 example of a burstable workload, or a negative 704 example of a burstable workload (e.g., a fixed workload).

Figure 8:
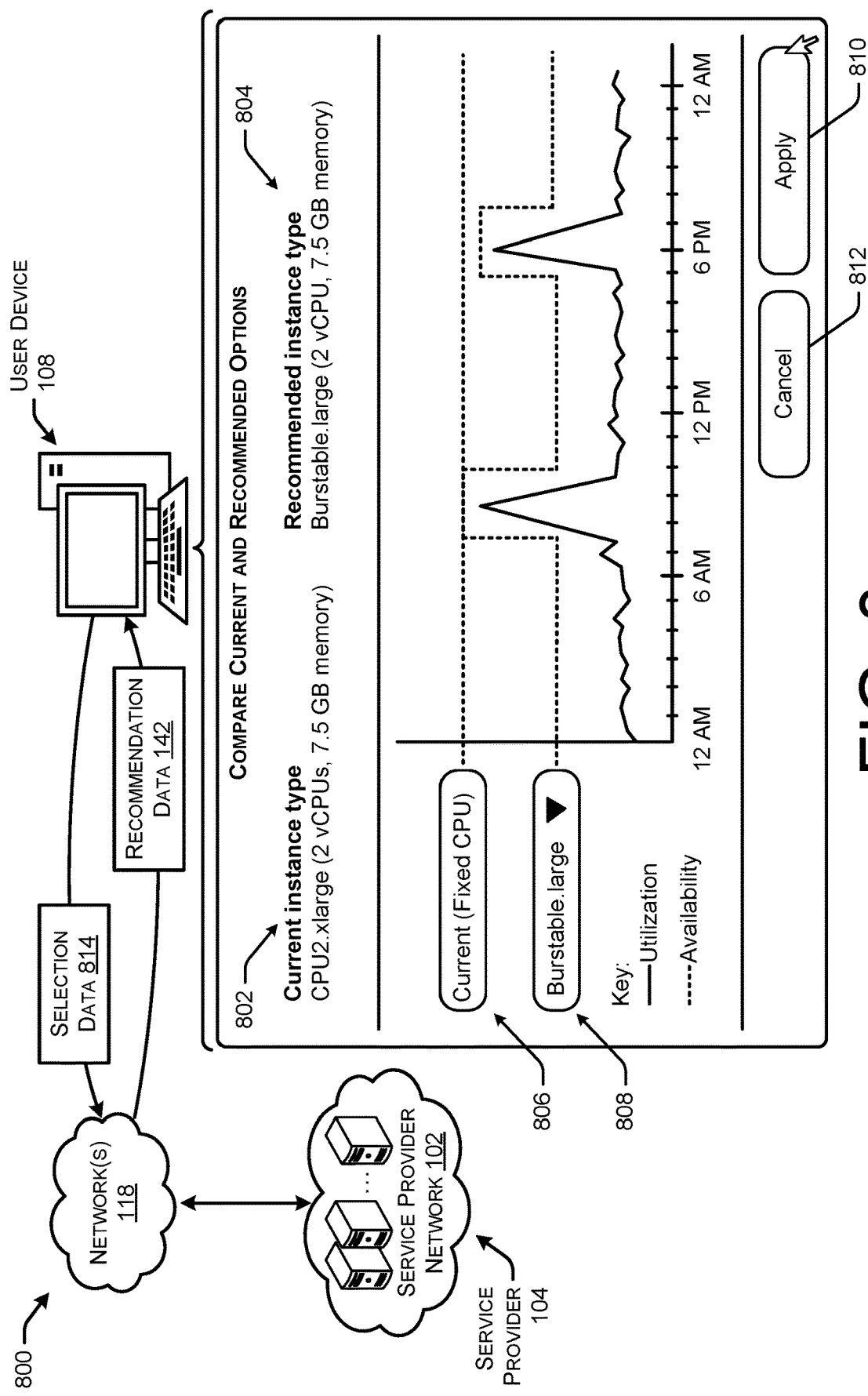
FIG. 8 illustrates a graphical user interface through which a user of a service provider network can review and apply a recommendation to host a workload on a burstable VM instance type.

FIG. 8 illustrates a graphical user interface (GUI) 800 through which a user of a service provider network 102 can review and implement a recommendation to use burstable VM instance types 132 that are optimized to support their workload 136. As illustrated, the user device 108 may receive recommendation data 142 from the service provider network 102. The recommendation data 142 may include a recommendation to use a burstable instance type 132.

The GUI 800 may include various data around the recommended burstable instance type 132, such as current instance types 802 for the workload 136 and recommended instance types 804. Further, the GUI 802 may indicate current performance 806 of the current instance type 802 with respect to utilization by the workload 136, as well as recommended performance 808 if the workload 136 was to be run on a burstable instance type 132. As illustrated, the current instance type 802 is over-provisioned, and the burstable instance type 132 is well-suited for hosting the workload 136.

As illustrated, the user has a first option 810 to apply the recommendation, and a second option to cancel 812 the recommendation. If the user selects the cancel option 812, then the workload 136 will continue to be hosted on the same instance 130. Conversely, upon selecting the apply option 810, the user device 108 may generate selection data 814 indicating the selection made by the user. For instance, the selection data 814 may indicate that the user would like to implement the recommended instance type 804 and begin hosting their workload 136 on the burstable instance type 132. It should be understood that the GUI 800 is merely illustrative and any type of user interface, or combination of user interfaces, may be utilized to prompt a user for information. Additionally, any type of input mechanism may be used to receive input data that can be used to define the selection data 418, such as text-input fields or drop-down selections.

Figure 9A:
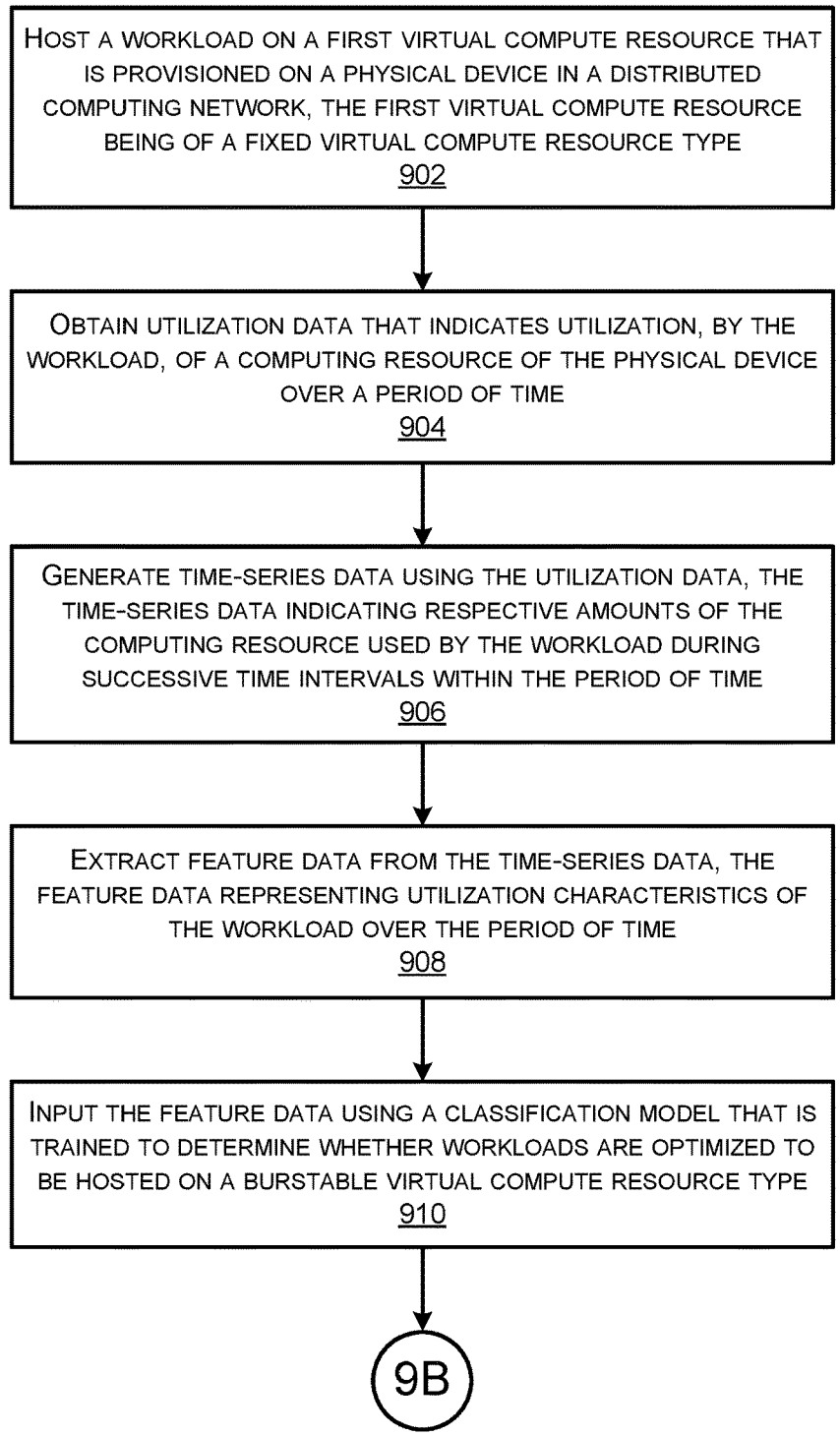
FIGS. 9A and 9B collectively illustrate a flow diagram of an example method for a service provider network to receive utilization data for a workload, determine that the workload is suitable and/or optimized to be hosted on a burstable VM instance type, provide a recommendation to a user to migrate their workload to the burstable VM instance type, and migrate the workload to the burstable VM instance type.
Figure 9B:
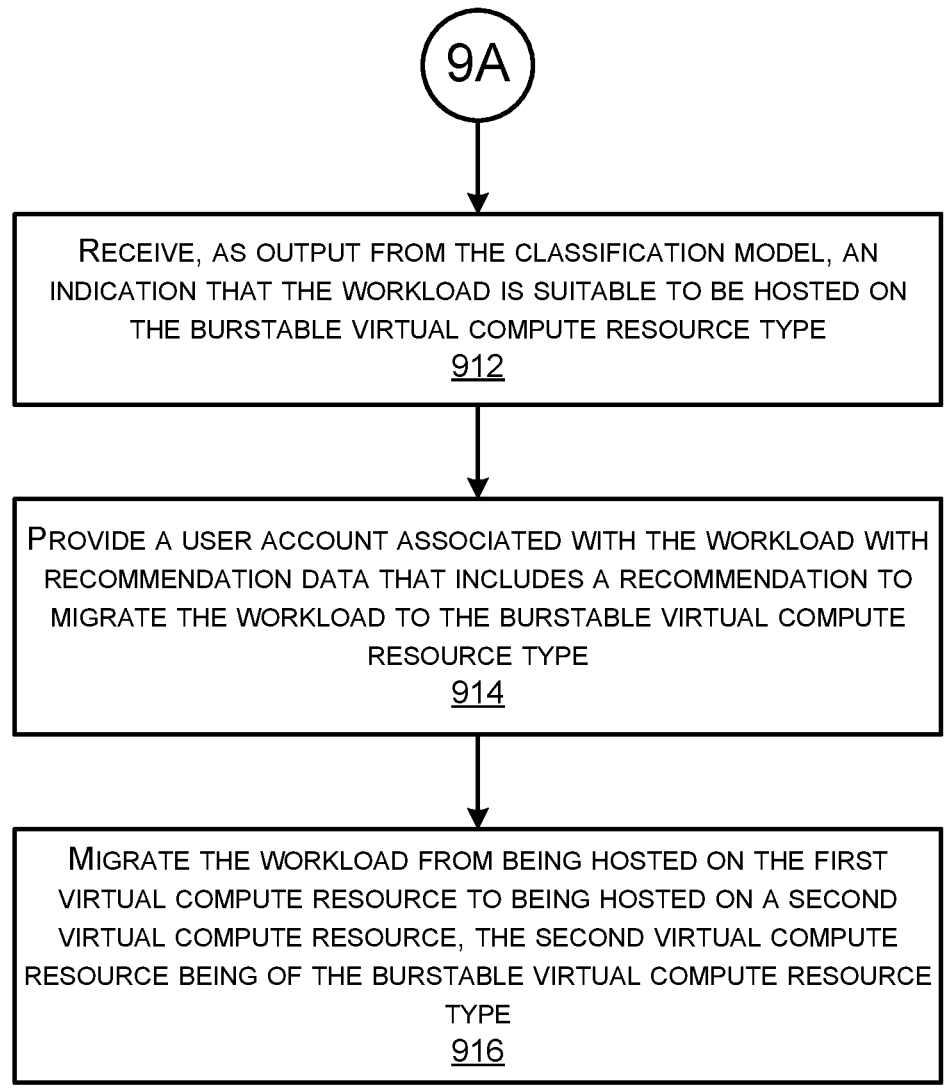
Figure 10:
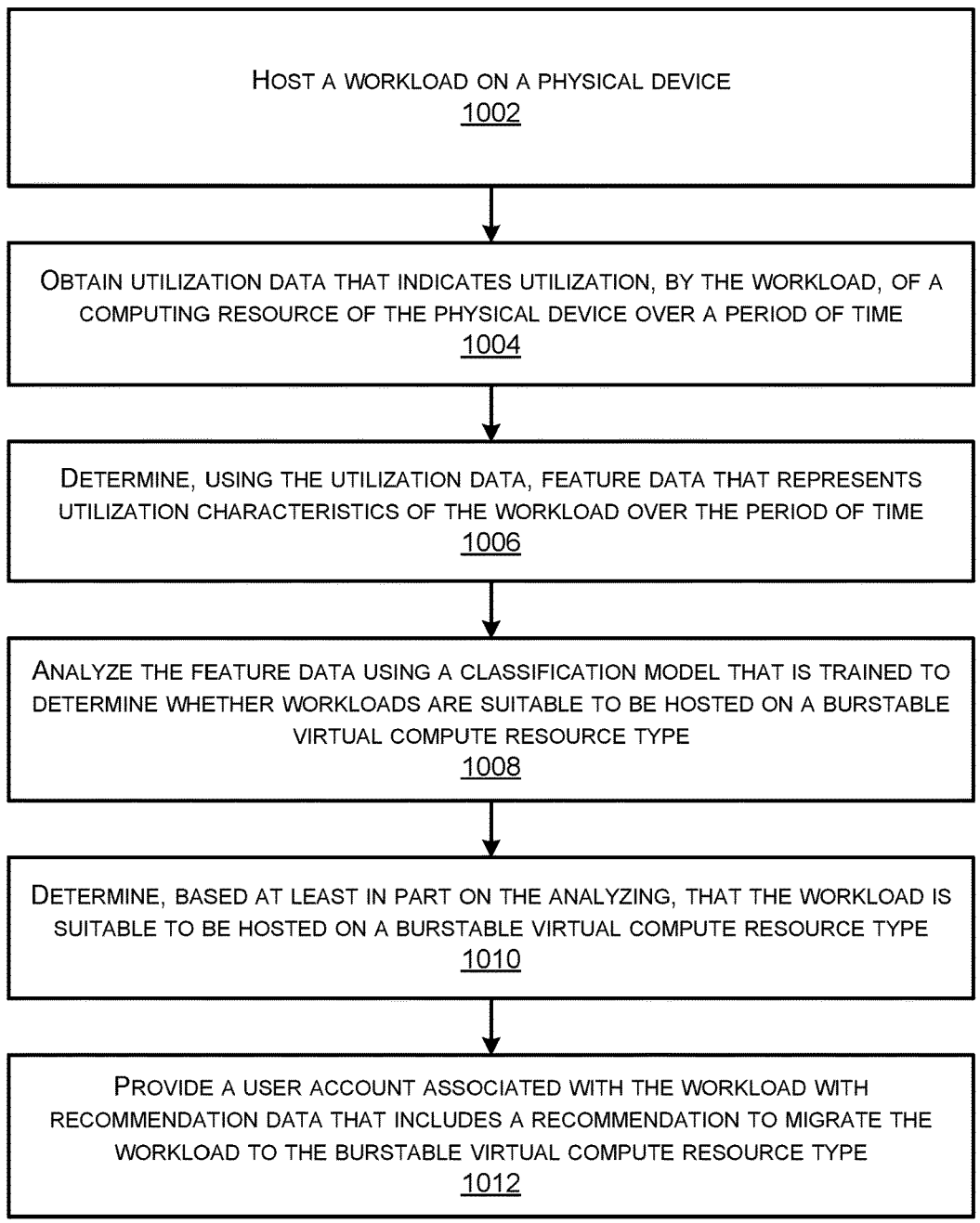
FIG. 10 illustrates a flow diagram of an example method for a service provider network to receive utilization data for a workload, determine that the workload is suitable and/or optimized to be hosted on a burstable VM instance type, and provide a recommendation to a user to migrate their workload to the burstable VM instance type.

FIGS. 9A, 9B, and 10 illustrate flow diagrams of example methods 900 and 1000 that illustrate aspects of the functions performed at least partly by the service provider network 102 as described in this disclosure. The logical operations described herein with respect to FIGS. 9A, 9B, and 10 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 9A, 9B, and 10 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 9A and 9B collectively illustrate a flow diagram of an example method 900 for a service provider network 106 to receive utilization data 138 for a workload 136, determine that the workload 136 is suitable or optimized to be hosted on a burstable VM instance type 132, provide a recommendation 142 to a user to migrate their workload 136 to the burstable VM instance type 132, and migrate the workload to the burstable VM instance type 132.

At 902, the service provider network 106 may host a workload on a first virtual compute resource that is provisioned on a physical device in a distributed computing network, where the first virtual compute resource being of a fixed virtual compute resource type. For instance, a workload 136 may be hosted on an instance 114 that is provisioned on a computing device 112(1), and the instance 114 may be of a fixed instance type 130.

At 904, the service provider network 106 may obtain utilization data that indicates utilization, by the workload, of a computing resource of the physical device over a period of time. For instance, the data-collection component 210 may collect resource-utilization data 138 that indicates utilization, by the workload 136, of a computing resource of the computing device 112(1) over a period of time.

At 906, the service provider network 106 may generate time-series data using the utilization data, the time-series data indicating respective amounts of the computing resource used by the workload during successive time intervals within the period of time. For instance, the feature-data component 220 may generate time-series data using the utilization data 138.

At 908, the service provider network 106 may extract feature data from the time-series data, the feature data representing utilization characteristics of the workload over the period of time. For instance, the feature-data component 218 may extract feature data 226 from the time-series data, where the feature data 226 represent utilization characteristics of the workload 136 over the period of time.

At 910, the service provider network 106 may input the feature data into a classification model that is trained to determine whether workloads are suitable to be hosted on a second virtual compute resource of a burstable virtual compute resource type that is different than the fixed virtual compute resource type. For instance, the classification component 224 may input the feature data 226 into the classification model 120.

At 912, the service provider network 106 may receive, as output from the classification model, an indication that the workload is suitable to be hosted on the second virtual compute resource of the burstable virtual compute resource type. For example, the classification model 120 may output a confidence value indicating how likely the workload 136 would be suitable or optimized to be hosted on a burstable instance type 132. The confidence value may be compared to a threshold value to determine whether the workload 136 is suitable for running on a burstable instance type 132, where confidence values above the threshold indicate suitability for burstable instance types 132, and confidence values below the threshold indicate that workloads 136 are not suitable for being hosted on a burstable instance type 132. As another example, the classification model 120 may provide binary output indicating that the candidate workload 136 is suitable or optimized for being hosted on a burstable instance type 132 (e.g., a "1"), or is not suitable or optimized for being hosted on a burstable instance type 132 (e.g., a "0").

At 914, the service provider network 106 may provide a user account associated with the workload with recommendation data that includes a recommendation to migrate the workload to the burstable virtual compute resource type. At 916, the service provider network 106 may migrate the workload from being hosted on the first virtual compute resource to being hosted on the second virtual compute resource.

FIG. 10 illustrates a flow diagram of an example method 1000 for a service provider network to receive utilization data for a workload, determine that the workload is suitable to be hosted on a burstable VM instance type, and provide a recommendation to a user to migrate their workload to the burstable VM instance type.

At 1002, the service provider network 106 may host a workload on a physical device. At 1004, the service provider network 106 may obtain utilization data that indicates utilization, by the workload, of a computing resource of the physical device over a period of time. At 1006, the service provider network 106 may determine, using the utilization data, feature data that represents one or more utilization characteristics of the workload over the period of time. At 1008, the service provider network 106 may analyze the feature data using a classification model that is trained to determine whether workloads are suitable to be hosted on one or more virtual compute resources of a burstable virtual compute resource type. At 1010, the service provider network 106 may determine, based at least in part on the analyzing, that the workload is suitable to be hosted on a second virtual compute resource of the burstable virtual compute resource type. At 1012, the service provider network 106 may provide a user account associated with the workload with recommendation data that includes a recommendation to migrate the workload to the second virtual compute resource.

Figure 11:
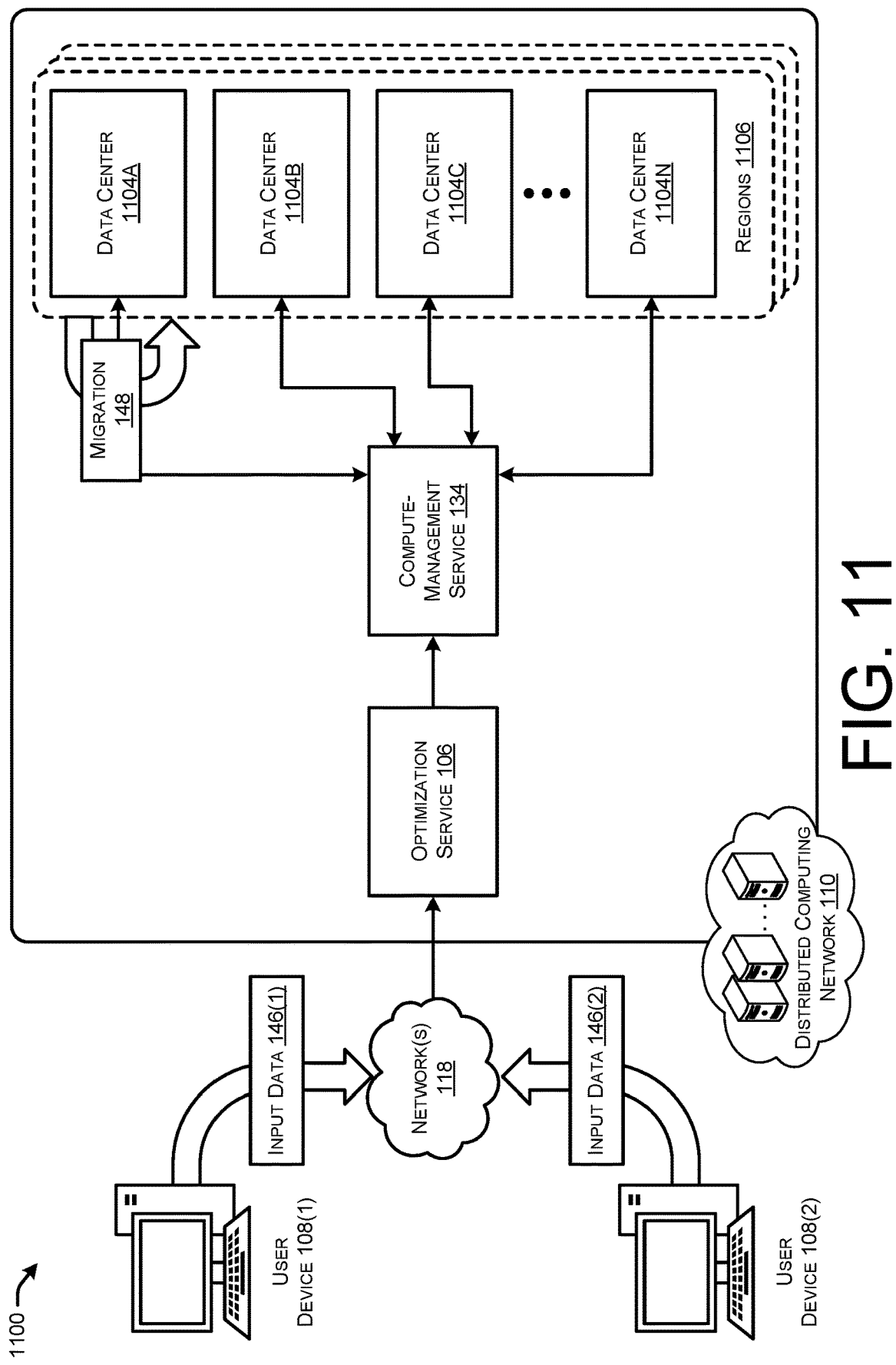
FIG. 11 is a system and network diagram that shows an illustrative operating environment that includes data centers of a service provider network that can be configured to implement aspects of the functionality described herein.

FIG. 11 is a system and network diagram 1100 that shows an illustrative operating environment that includes data centers 1104 in one or more regions 1106 of a distributed computing network 110 that can be configured to implement aspects of the functionality described herein. The distributed computing network 110 can provide computing resources, like VM instances and storage, on a permanent or an as-needed basis. Among other types of functionality, the computing resources provided by the service provider network 102 may be utilized to implement the various services described above. As also discussed above, the computing resources provided by the distributed computing network 110 can include various types of computing resources, such as data processing resources like VM instances, data storage resources, networking resources, data communication resources, network services, and the like.

Each type of computing resource provided by the distributed computing network 110 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The distributed computing network 110 can also be configured to provide other types of computing resources not mentioned specifically herein.

The computing resources provided by the distributed computing network 110 may be enabled in one embodiment by one or more data centers 1104A-1104N (which might be referred to herein singularly as "a data center 1104" or in the plural as "the data centers 1104"). The data centers 1104 are facilities utilized to house and operate computer systems and associated components. The data centers 1104 typically include redundant and backup power, communications, cooling, and security systems. The data centers 1104 can also be located in geographically disparate locations, or regions 1106. One illustrative embodiment for a data center 1104 that can be utilized to implement the technologies disclosed herein will be described below with regard to FIG. 12.

The users of the user devices 108 that utilize the distributed computing network 110 may access the computing resources provided by the service provider network 102 over any wired and/or wireless network(s) 118, which can be a wide area communication network ("WAN"), such as the Internet, an intranet or an Internet service provider ("ISP") network or a combination of such networks. For example, and without limitation, a user device 108 operated by a user of the distributed computing network 110 may be utilized to access the distributed computing network 110 by way of the network(s) 118. It should be appreciated that a local-area network ("LAN"), the Internet, or any other networking topology known in the art that connects the data centers 1104 to remote clients and other users can be utilized. It should also be appreciated that combinations of such networks can also be utilized.

Figure 12:
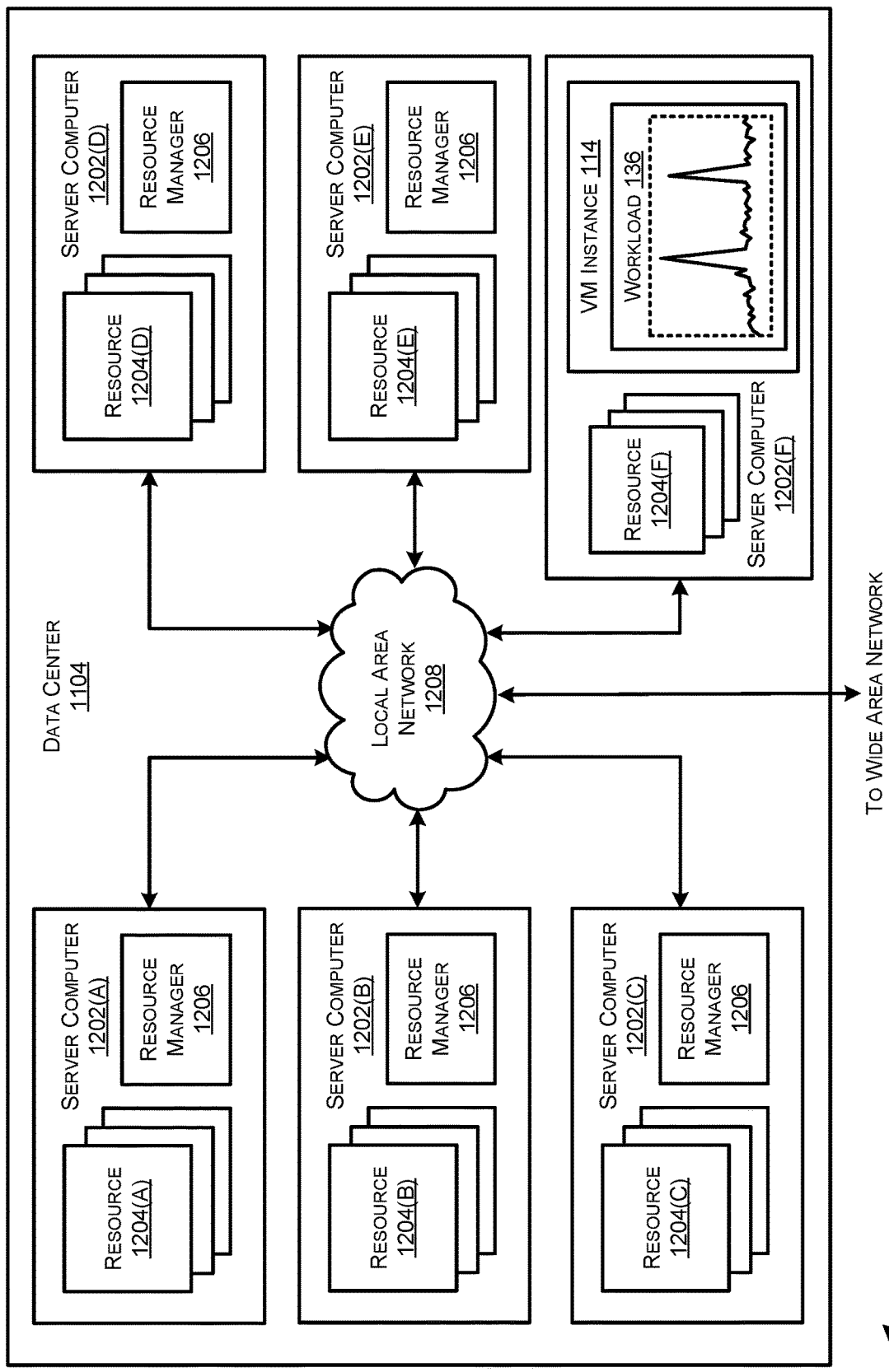
FIG. 12 is a computing system diagram illustrating a configuration for a data center that can be utilized to implement aspects of the technologies disclosed herein.

FIG. 12 is a computing system diagram 1200 that illustrates one configuration for a data center 1104 that implements aspects of the technologies disclosed herein. The example data center 1104 shown in FIG. 12 includes several server computers 1202A-1202F (which might be referred to herein singularly as "a server computer 1202" or in the plural as "the server computers 1102") for providing computing resources 1204A-1204E. In some examples, the resources 1204 and/or server computers 1202 may include, be included in, or correspond to, the computing devices 112 described herein.

The server computers 1202 can be standard tower, rack-mount, or blade server computers configured appropriately for providing the computing resources described herein (illustrated in FIG. 12 as the computing resources 1204A-1204E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1202 can also be configured to execute a resource manager 1106 capable of instantiating and/or managing the computing resources. In the case of VM instances, for example, the resource manager 1206 can be a hypervisor or another type of program configured to enable the execution of multiple VM instances on a single server computer 1202. Server computers 1202 in the data center 1104 can also be configured to provide network services and other types of services.

In the example data center 1104 shown in FIG. 12, an appropriate LAN 1208 is also utilized to interconnect the server computers 1202A-1202F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1204A-1204N, between each of the server computers 1202A-1202F in each data center 1204, and, potentially, between computing resources in each of the server computers 1202. It should be appreciated that the configuration of the data center 1104 described with reference to FIG. 12 is merely illustrative and that other implementations can be utilized.

The data center 1104 shown in FIG. 12 also includes a server computer 1202F that can execute some or all of the software components described above. For example, and without limitation, the server computer 1202F (and the other server computers 1202) can generally be included in to the computing devices 112 of FIG. 1 and be configured to execute components, including the components of the optimization service 106, the compute-management service 134, the distributed computing network 110, and/or the other software components described above. The server computer 1202F can also be configured to execute other components and/or to store data for providing some or all of the functionality described herein. In this regard, it should be appreciated that the services illustrated in FIG. 12 as executing on the server computer 1202F can execute on many other physical or virtual servers in the data centers 1104 in various embodiments.

Figure 13:
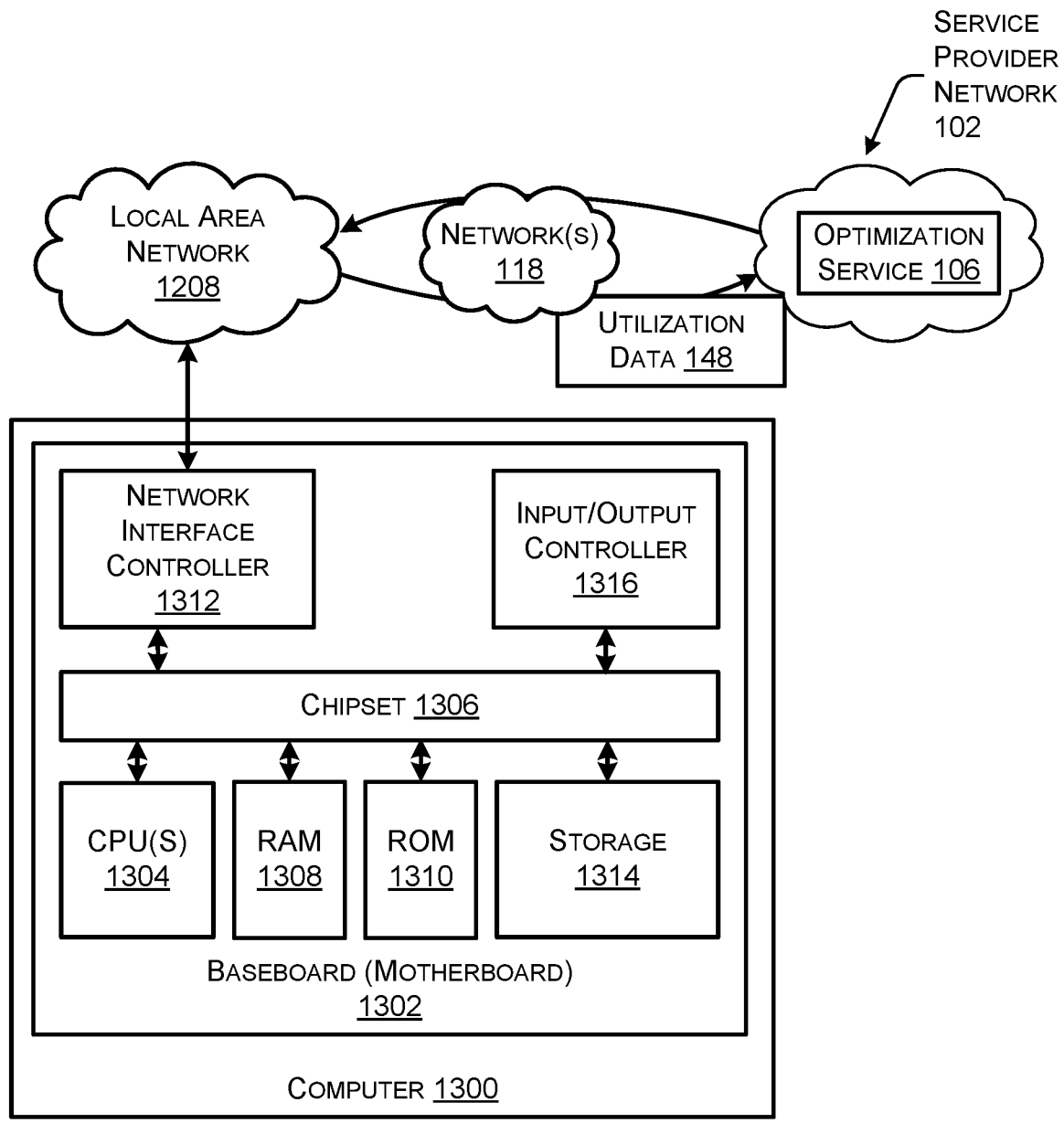
FIG. 13 is a computer architecture diagram showing an illustrative computer hardware architecture for implementing a computing device that can be utilized to implement aspects of the various technologies presented herein.

FIG. 13 shows an example computer architecture for a computer 1300 capable of executing program components for implementing the functionality described above. The computer architecture shown in FIG. 13 illustrates a conventional server computer, workstation, desktop computer, laptop, tablet, network appliance, e-reader, smartphone, or other computing device, and can be utilized to execute any of the software components presented herein. In some examples, the server computer 1300 may correspond to, or be the same as or similar to, a computing device 112 described in FIG. 1.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 1208. The chipset 1306 can include functionality for providing network connectivity through a network interface controller (NIC) 1312, such as a gigabit Ethernet adapter. The NIC 1312 is capable of connecting the computer 1300 to other computing devices over the network 1208 (or 118). It should be appreciated that multiple NICs 1312 can be present in the computer 1300, connecting the computer to other types of networks and remote computer systems.

The computer 1300 can include storage 1314 (e.g., disk) that provides non-volatile storage for the computer. The storage 1314 can consist of one or more physical storage units. The storage 1314 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the storage 1314 by detecting the physical states or characteristics of one or more particular locations within the physical storage units.

In addition to the storage 1314 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300. In some examples, the operations performed by the service provider network 102, and or any components included therein, may be supported by one or more devices similar to computer 1300. Stated otherwise, some or all of the operations performed by the service provider network 102, and or any components included therein, may be performed by one or more computer devices 1300 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1314 can store an operating system utilized to control the operation of the computer 1300. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1314 can store other system or application programs and data utilized by the computer 1300.

In one embodiment, the storage 1314, RAM 1308, ROM 1310, and/or other computer-readable storage media may be encoded with computer-executable instructions which, when loaded into the computer 1300, transform the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various techniques described above. The computer 1300 can also include computer-readable storage media having instructions stored thereupon for performing any of the other computer-implemented operations described herein.

Generally, the computer 1300 may be an example of a computing device 112 (and other computing devices, servers, etc.) described herein. The CPU(s) 1304, RAM 1308, ROM 1310, storage 1314, bandwidth of the NIC 1312, and/or other resources of the computer 1300 may be allocated to one or more different VM instances 114/116 as described herein based on the VM instance types 114/116.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the computer 1300 might not include all of the components shown in FIG. 13, can include other components that are not explicitly shown in FIG. 13, or might utilize an architecture completely different than that shown in FIG. 13.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
hosting a workload on a first virtual machine (VM) that is provisioned on a physical device in a distributed computing network, the first VM being of a fixed VM type, the fixed VM type providing the workload with use of a first predefined amount of computing resources of the distributed computing device;
obtaining utilization data that indicates utilization, by the workload, of a computing resource of the physical device over a period of time;
generating time-series data using the utilization data, the time-series data indicating respective amounts of the computing resource used by the workload during successive time intervals within the period of time;
extracting feature data from the time-series data, the feature data representing utilization characteristics that are indicative of burstable resource consumption by the workload over the period of time;
inputting the feature data into a classification model that is trained to determine whether workloads are suitable to be hosted on a second VM of a burstable VM type that is different than the fixed VM type, the burstable VM type providing the workload with use of a second predefined amount of the computing resources along with intermittent use of additional amounts of the computing resources, wherein the additional amounts of the computing resources provided by the burstable VM type are not guaranteed for use by the workload for an entirety of the period of time;
receiving, as output from the classification model, an indication that the workload is suitable to be hosted on the second VM of the burstable VM type;
providing a user account associated with the workload with recommendation data that includes a recommendation to migrate the workload to the burstable VM type; and
migrating the workload from being hosted on the first VM to being hosted on the second VM.

2. The method of claim 1, wherein the feature data represents at least one of:
a length of the period of time;
a number of instances where the amounts of the computing resources used by the workload in the successive time intervals exceeded a threshold amount;
a median utilization rate during the period of time;
a mean utilization rate during the period of time;
a measure of skewness represented in the time-series data; or
a measure of kurtosis represented in the time-series data.

3. The method of claim 1, further comprising:
generating first feature data sets using first historical utilization data associated with a plurality of first workloads, the plurality of first workloads running on first VMs of burstable VM types in the distributed computing network;
generating second feature data sets using second historical utilization data associated with a plurality of second workloads, the plurality of second workloads running on second VMs of fixed VM types in the distributed computing network;
labeling the first feature data sets with first labels that correspond to the first VMs to generate first training data;
labeling the second feature data sets with second labels that correspond to the second VMs; and
training the classification model using the first training data and the second training data.

4. A system comprising:
one or more processors; and
one or more computer-readable media storing instructions that, when executed by the one or more processors, cause the one or more processors to perform operations comprising:
hosting a workload on an initial virtual machine (VM) that is running on a physical device, the initial VM being of a fixed VM type that provides the workload with use of a first predefined amount of a computing resource of the physical device;
obtaining utilization data that indicates utilization, by the workload, of a computing resource of the physical device over a period of time;
determining, using the utilization data, feature data that represents a utilization characteristic that is indicative of burstable resource consumption by the workload over the period of time;
analyzing the feature data using a classification model that is trained to determine whether workloads are suitable to be hosted on one or more VMs of a burstable VM type, the burstable VM type providing the workload with use of a second predefined amount of the computing resource along with intermittent use of additional amounts of the computing resource of the physical device, wherein the additional amounts of the computing resources provided by the burstable VM type are not guaranteed for use by the workload for an entirety of the period of time;
determining, based at least in part on the analyzing, that the workload is suitable to be hosted on a VM of the burstable VM type; and
hosting the workload on the VM that is of the burstable VM type.

5. The system of claim 4, the operations further comprising:
providing a user account associated with the workload with recommendation data that includes a recommendation to host the workload to the VM;
receiving input from the user account indicating a request to host the workload on the VM; and
migrating the workload to the VM.

6. The system of claim 4, wherein determining the feature data includes:
generating time-series data using the utilization data, the time-series data indicating respective amounts of the computing resource used by the workload during successive time intervals within the period of time; and
extracting the feature data from the time-series data, the feature data representing the one or more utilization characteristics of the workload over the period of time.

7. The system of claim 6, wherein the feature data represents at least one of:
a length of the period of time;
a number of instances where the amounts of the computing resources used by the workload in the successive time intervals exceeded a threshold amount;
a median utilization rate during the period of time;
a mean utilization rate during the period of time;
a measure of skewness represented in the time-series data; or
a measure of kurtosis represented in the time-series data.

8. The system of claim 4, the operations further comprising:
- generating first feature data sets using first historical utilization data associated with a plurality of first workloads, the plurality of first workloads running on first VMs of burstable VM types;
- generating second feature data sets using second historical utilization data associated with a plurality of second workloads, the plurality of second workloads running on second VMs of fixed VM types;
- labeling the first feature data sets with first labels that correspond to the first VMs to generate first training data;
- labeling the second feature data sets with second labels that correspond to the second VMs; and
- training the classification model using the first training data and the second training data.

9. The system of claim 4, the operations further comprising:
- determining an average utilization of the computing resource used by the workload during the period of time;
- mapping the average utilization to a predefined amount of computing resources provided by the VM; and
- selecting the VM from among of a group of other VMs of burstable VM types based at least in part on the mapping.

10. The system of claim 4, wherein the computing resource corresponds to at least one of:
- a central processing unit (CPU) resource;
- a memory resource;
- a storage resource; or
- a network availability resource.

11. The system of claim 4, wherein:
- the fixed VM type prevents the workload from utilizing more than the first predefined amount of the computing resource of the physical device; and
- the burstable VM type allows the workload to utilize the additional amounts of the computing resource beyond the second predefined amount of the computing resource.

12. The system of claim 4, wherein:
- the second predefined amount of the computing resources provided by the burstable VM type are guaranteed for use by the workload for an entirety of a period of time.

13. A method comprising:
- hosting a workload on a physical device;
- obtaining utilization data that indicates utilization, by the workload, of a computing resource of the physical device over a period of time;
- determining, using the utilization data, feature data that represents one or more utilization characteristics that are indicative of burstable resource consumption by the workload over the period of time;
- analyzing the feature data using a classification model that is trained to determine whether workloads are suitable to be hosted on one or more virtual machines (VMs) of a burstable VM type, the burstable VM type providing the workload with use of a predefined amount of the computing resource along with intermittent use of additional amounts of the computing resource of the physical device, wherein the additional amounts of the computing resources provided by the burstable VM type are not guaranteed for use by the workload for an entirety of the period of time;
- determining, based at least in part on the analyzing, that the workload is suitable to be hosted on a VM of the burstable VM type; and
- providing a user account associated with the workload with recommendation data that includes a recommendation to host the workload on the VM.

14. The method of claim 13, further comprising:
- receiving input from the user account indicating a request to host the workload on the VM; and
- hosting the workload on the VM.

15. The method of claim 13, wherein determining the feature data includes:
- generating time-series data using the utilization data, the time-series data indicating respective amounts of the computing resource used by the workload during successive time intervals within the period of time; and
- extracting the feature data from the time-series data, the feature data representing the one or more utilization characteristics of the workload over the period of time.

16. The method of claim 15, wherein the feature data represents at least one of:
- a length of the period of time;
- a number of instances where the amounts of the computing resources used by the workload in the successive time intervals exceeded a threshold amount;
- a median utilization rate during the period of time;
- a mean utilization rate during the period of time;
- a measure of skewness represented in the time-series data; or
- a measure of kurtosis represented in the time-series data.

17. The method of claim 13, further comprising:
- generating first feature data sets using first historical utilization data associated with a plurality of first workloads, the plurality of first workloads running on first VMs of burstable VM types;
- generating second feature data sets using second historical utilization data associated with a plurality of second workloads, the plurality of second workloads running on second VMs of fixed VM types;
- labeling the first feature data sets with first labels that correspond to the first VMs to generate first training data;
- labeling the second feature data sets with second labels that correspond to the second VMs; and
- training the classification model using the first training data and the second training data.

18. The method of claim 17, further comprising:
- determining that at least one of the plurality of first workloads is associated with particular historical utilization data that is less than a threshold utilization value; and
- removing a portion of the first feature data that corresponds to the particular historical utilization data.

19. The method of claim 13, further comprising:
- determining an average utilization of the computing resource used by the workload during the period of time;
- mapping the average utilization to a predefined amount of computing resources provided by the VM; and
- selecting the VM from among of a group of other VMs of burstable VM types based at least in part on the mapping.

20. The method of claim 13, wherein the computing resource corresponds to at least one of:
   a central processing unit (CPU) resource;
   a memory resource;
   a storage resource; or
   a network availability resource.

\* \* \* \* \*